US012734934B2

(12) United States Patent
Takao

(10) Patent No.: US 12,734,934 B2
(45) Date of Patent: Sep. 15, 2026

(54) MANAGEMENT DEVICE AND POWER SUPPLY SYSTEM

(71) Applicant: Panasonic Intellectual Property Management Co., Ltd., Osaka (JP)

(72) Inventor: Hiroshi Takao, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 881 days.

(21) Appl. No.: 18/041,691

(22) PCT Filed: Aug. 30, 2021

(86) PCT No.: PCT/JP2021/031646
§ 371 (c)(1),
(2) Date: Feb. 14, 2023

(87) PCT Pub. No.: WO2022/070716
PCT Pub. Date: Apr. 7, 2022

(65) Prior Publication Data

US 2023/0311706 A1 Oct. 5, 2023

(30) Foreign Application Priority Data

Sep. 29, 2020 (JP) ................................ 2020-163854

(51) Int. Cl.
*H02J 7/00* (2026.01)
*B60L 58/12* (2019.01)
(Continued)

(52) U.S. Cl.
CPC ............... *B60L 58/22* (2019.02); *B60L 58/12* (2019.02); *H02J 7/50* (2026.01); *H02J 7/82* (2026.01);
(Continued)

(58) Field of Classification Search
USPC ........................................................ 320/134
See application file for complete search history.

(56) References Cited

U.S. PATENT DOCUMENTS

2010/0085009 A1* 4/2010 Kang ........................ H02J 7/56 324/427
2011/0133558 A1* 6/2011 Park .......................... H02J 3/32 307/66
(Continued)

FOREIGN PATENT DOCUMENTS

JP 2009-033936 2/2009
WO 2012/164630 12/2012

OTHER PUBLICATIONS

International Search Report of PCT application No. PCT/JP2021/031646 dated Nov. 16, 2021.

*Primary Examiner* — Samuel Berhanu
(74) *Attorney, Agent, or Firm* — Rimon P.C.

(57) ABSTRACT

Provided is management device that manages a plurality of power storage modules connected in parallel to load with respective switches. Management device has a first state where some of switches connected to some of the plurality of power storage modules are turned on and other of switches connected to remaining power storage modules are turned off, and includes determination unit that does not permit turning on at least one of the other of switches connected to other power storage modules and turned off in the first state when an upper limit value of current or power that is allowed to be discharged to load from the entire plurality of power storage modules is lower than a first threshold based on a maximum value of current or power required by load in a state where the at least one of the other of switches is turned on.

5 Claims, 15 Drawing Sheets

(51) Int. Cl.
*B60L 58/22* (2019.01)
*H02J 7/50* (2026.01)
*H02J 7/82* (2026.01)
*B60L 50/60* (2019.01)
*B60L 53/60* (2019.01)

(52) U.S. Cl.
CPC ............... *H02J 7/855* (2026.01); *B60L 50/60* (2019.02); *B60L 53/60* (2019.02)

(56) References Cited

U.S. PATENT DOCUMENTS

| | | | | |
|---|---|---|---|---|
| 2012/0268070 | A1* | 10/2012 | Park .................... | H01M 10/441<br>320/126 |
| 2014/0103859 | A1 | 4/2014 | Nishi | |
| 2016/0033125 | A1* | 2/2016 | Krichtafovitch .......... | H02J 7/00<br>431/2 |

* cited by examiner

MANAGEMENT DEVICE AND POWER SUPPLY SYSTEM

TECHNICAL FIELD

The present disclosure relates to a management device that manages a plurality of power storage modules connected in parallel to a load, and a power supply system.

BACKGROUND ART

In recent years, relatively low-power (for example, drive at 48 V) electric vehicles, such as an electric motorcycle, an electric golf cart, an electric land car, and a forklift, have been widely used. Some of such electric vehicles use a power supply system where a plurality of detachable and replaceable battery packs is connected in parallel. When the plurality of battery packs is connected in parallel, a cross current can be generated.

There has been proposed control for preventing a current exceeding a rated current from flowing through battery packs or a relay due to a cross current when the battery packs being separated are connected in parallel (e.g., see PTL 1). There also has been proposed control for estimating a transient voltage at a time of cutting the connection between batteries connected in parallel, and turning off a relay when the voltage of the relay is likely to exceed a rated voltage (e.g., see PTL 2).

CITATION LIST

Patent Literature

PTL 1: Unexamined Japanese Patent Publication No. 2009-33936

PTL 2: WO 2012/164630 A

SUMMARY OF THE INVENTION

Technical Problem

When battery packs being separated are connected in parallel at the time of discharge, an upper limit value of current or power allowed to be discharged from the entire parallel system usually increases. However, due to the cross current generated by the parallel connection, the upper limit value of the current or power allowed to be discharged from the entire parallel system may decreases to be lower than that before the parallel connection. This decrease in the upper limit value may cause adverse effects such as degradation in acceleration performance of an electric vehicle.

When battery packs being separated are connected in parallel at the time of charge, an upper limit value of current or power allowed to be charged to the entire parallel system usually increases. However, due to the cross current generated by the parallel connection, the upper limit value of the current or power allowed to be charged to the entire parallel system may decreases to be lower than that before the parallel connection. This decrease in the upper limit value may cause adverse effects such as an increase in charging time and a decrease in regenerative braking force.

The present disclosure has been made in view of such circumstances, and an object thereof is to provide a technique that prevents a shortage state of a current to be supplied from the parallel system to the load. Another object of the present disclosure is to provide a technique for preventing a decrease in charging efficiency when the parallel system is charged.

To solve the above problem, a management device according to an aspect of the present disclosure manages a plurality of power storage modules connected in parallel to a load with switches and has a first state where some of the switches connected to some of the plurality of power storage modules are turned on and other of the switches connected to remaining power storage modules are turned off, the management device including a determination unit that does not permit turning on at least one of the other of the switches connected to the other power storage modules and turned off in the first state when an upper limit value of current or power that is allowed to be discharged to the load from the entire plurality of power storage modules is lower than a first threshold based on a maximum value of current or power required by the load in a state where the at least one of the other of the switches is turned on.

Another aspect of the present disclosure is a management device. This management device manages a plurality of power storage modules connected in parallel to a power source with switches and has a first state where some of the switches connected to some of the plurality of power storage modules are turned on and other of the switches connected to remaining power storage modules are turned off, the management device including a determination unit that does not allow at least one of the other of the switches connected to the other power storage modules and turned off to be turned on in the first state when an upper limit value of current or power, being allowed to be charged into the entire plurality of power storage modules, with the at least one of the other of the switches turned on, is lower than a third threshold based on a maximum value of current or power to be output by the power source.

The present disclosure enables preventing a shortage of a current to be supplied from a parallel system to a load. The present disclosure also enables preventing a decrease in charging efficiency when the parallel system is charged.

DESCRIPTION OF EMBODIMENT

Figure 1:
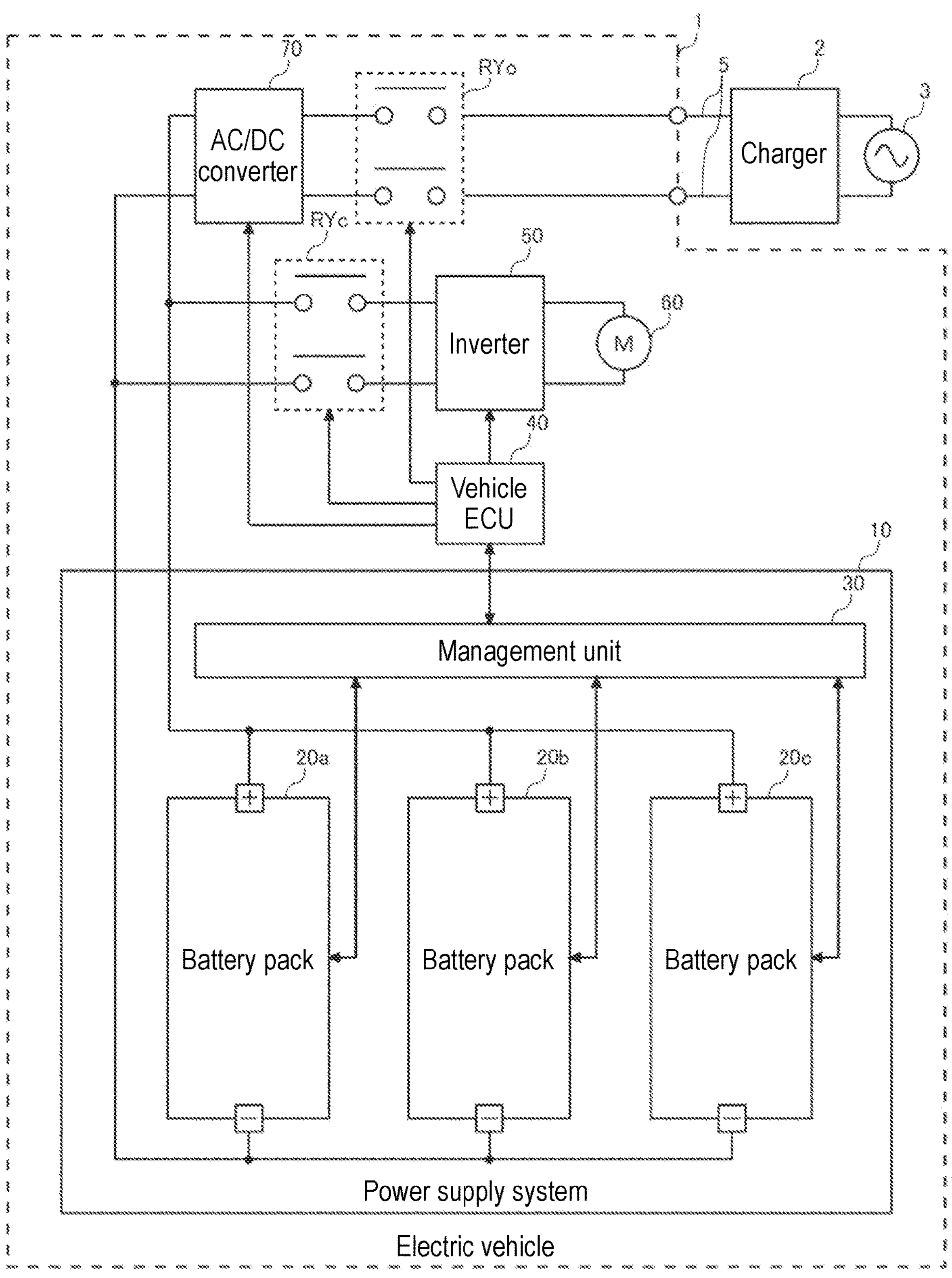
FIG. 1 is a view illustrating an electric vehicle equipped with a power supply system according to an exemplary embodiment.

FIG. 1 is a view illustrating electric vehicle 1 equipped with power supply system 10 according to an exemplary embodiment of the present disclosure. Electric vehicle 1 is an electric vehicle using replaceable battery pack 20 as a power source, and corresponds to, for example, an electric motorcycle, an electric golf cart, an electric land car, or a forklift. Battery pack 20 is a portable and replaceable battery pack that is detachable, and can be mounted in a mounting slot of electric vehicle 1 by a user.

Power supply system 10 is connected to motor 60 via main relay RYc and inverter 50. At the time of power running, inverter 50 converts DC power supplied from power supply system 10 into AC power and supplies the AC power to motor 60. At the time of regeneration, inverter 50 converts AC power supplied from motor 60 into DC power and supplies the DC power to power supply system 10. Motor 60 is a three-phase AC motor, and rotates in accordance with the AC power supplied from inverter 50 at the time of power running. At the time of regeneration, the motor converts rotational energy by deceleration into AC power and supplies the AC power to inverter 50.

Vehicle electronic control unit (ECU) 40 is a control device that entirely controls electric vehicle 1. Main relay RYc is a contactor inserted between wiring connecting power supply system 10 and inverter 50. During running of electric vehicle 1, vehicle ECU 40 controls main relay RYc to an on state (closed state) and electrically connects power supply system 10 with a power system of electric vehicle 1. During non-running of electric vehicle 1, vehicle ECU 40 controls main relay RYc into an off-state (close state), and disconnects the electrical connection between power supply system 10 and the power system of electric vehicle 1. Instead of the relay, another type of switch such as a semiconductor switch may be used.

Electric vehicle 1 can be connected to charger 2 with charging cable 5. Charger 2 is connected to a commercial power system (hereinafter, simply referred to as system 3), and can charge battery pack 20 in power supply system 10 from the outside of electric vehicle 1. When charger 2 is a normal charger, battery pack 20 is generally charged with single-phase 100/200 V AC power. In this case, charger 2 and battery pack 20 are electrically connected via charging cable 5, external charging relay RYo, and AC/DC converter 70.

Vehicle ECU 40 controls external charging relay RYo to turn on external charging relay RYo at the time of charging from charger 2. Instead of the relay, another type of switch such as a semiconductor switch may be used. AC/DC converter 70 includes a rectifier circuit and a DC/DC converter. The rectifier circuit rectifies AC power supplied from charger 2 to generate DC power. The DC/DC converter controls current or voltage of DC power generated by the rectifier circuit in accordance with a current command value or a voltage command value specified by vehicle ECU 40. This enables constant current (CC) charging or constant voltage (CV) charging.

When charger 2 is a quick charger, charger 2 rectifies AC power supplied from system 3 to generate DC power. Usable quick charging standards include, for example, CHAdeMO (registered trademark), GB/T, and combined charging system (Combo).

Charging cable 5 capable of quick charging includes not only a power line but also a communication line. Vehicle ECU 40 can transmit a current command value or a voltage command value to charger 2 through the communication line. Charger 2 controls current or voltage of the DC power to be output in accordance with the current command value or the voltage command value received from vehicle ECU 40. In this case, AC/DC converter 70 in electric vehicle 1 is bypassed. The current or voltage of the DC power may be controlled by the DC/DC converter in AC/DC converter 70 by bypassing only the rectifier circuit of AC/DC converter 70 without being controlled by charger 2.

FIG. 1 illustrates an example in which battery pack 20 is charged while being attached to electric vehicle 1. In this regard, battery pack 20 also can be charged while being separated from electric vehicle 1. In this case, battery pack 20 can be charged by attaching battery pack 20 to a charging stand outside electric vehicle 1.

Power supply system 10 includes a plurality of battery packs 20*a*-20*c* and management unit 30. The plurality of battery packs 20*a*-20*c* is connected in parallel to a load (mainly motor 60) of electric vehicle 1. At the time of regeneration, motor 60 serves as a power source for the plurality of battery packs 20*a* to 20*c*. The number of battery packs 20 in parallel is determined according to a required capacity or a required output of electric vehicle 1. FIG. 1 illustrates an example where three battery packs 20*a*-20*c* are connected in parallel. However, the present disclosure is not limited to the case where three battery packs are connected in parallel. The larger number of battery packs 20 may be connected in parallel so as to extend a millage. Further, in the case of small electric vehicle 1, two battery packs may be connected in parallel.

Figure 2:
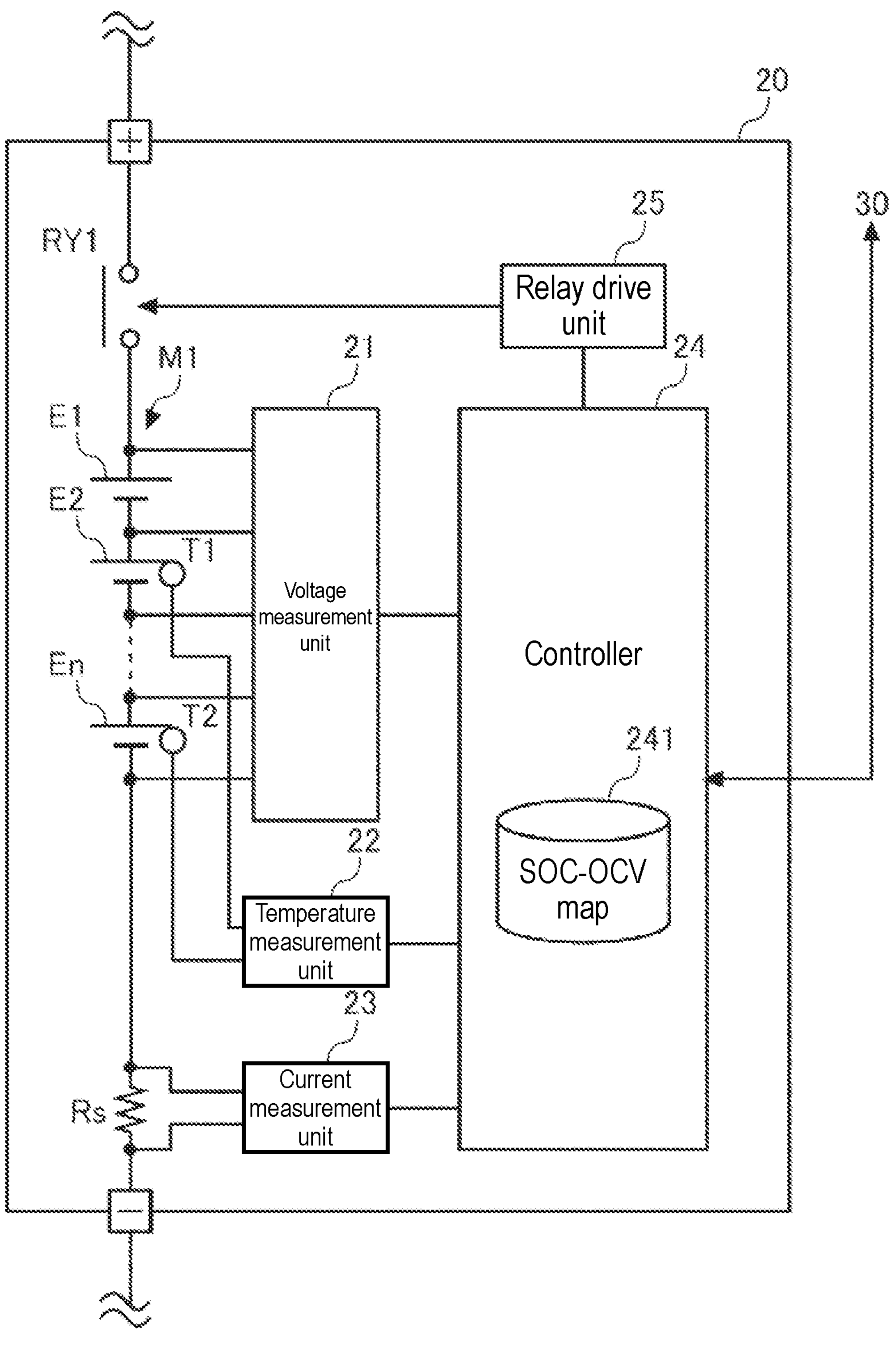
FIG. 2 is a view illustrating an example of an internal configuration of a battery pack in FIG. 1.

FIG. 2 is a view illustrating an internal configuration example of battery pack 20 of FIG. 1. Battery pack 20 includes pack relay RY1, relay drive unit 25, battery module M1, shunt resistor Rs, temperature sensors T1 and T2, voltage measurement unit 21, temperature measurement unit 22, current measurement unit 23, and controller 24. Relay drive unit 25 turns on or off pack relay RY1 in response to a control signal received from management unit 30 via controller 24.

Battery module M1 includes a plurality of cells E1 to En connected in series. Battery module M1 may be configured by connecting, in series, a plurality of cell blocks including a plurality of cells connected in parallel. As the cell, a lithium ion battery cell, a nickel metal hydride battery cell, a lead battery cell, or the like can be used. Hereinafter, the present description assumes an example of use of lithium ion battery cells (nominal voltage: 3.6 V to 3.7 V).

Shunt resistor Rs is connected in series with the plurality of cells E1 to En configuring battery module M1. Shunt resistor Rs functions as a current detection element. A Hall element may be used in place of shunt resistor Rs. The plurality of temperature sensors T1, T2 for detecting temperatures of the plurality of cells E1 to En is disposed. One temperature sensor may be disposed in battery module M1, or a plurality of temperature sensors may be disposed in battery module M1. For example, a thermistor can be used for temperature sensors T1, T2.

A plurality of voltage lines are connected between nodes of the plurality of cells E1 to En connected in series and voltage measurement unit 21. Voltage measurement unit 21 measures voltage of each of cells E1 to En by measuring a voltage between each two adjacent voltage lines. Voltage measurement unit 21 transmits the measured voltages of cells E1 to En to controller 24 via a communication line.

Voltage measurement unit 21 has a higher voltage with respect to controller 24, so that voltage measurement unit 21 and controller 24 are connected by the communication line in a state where they are insulated as necessary. Voltage measurement unit 21 can be configured using an application specific integrated circuit (ASIC) or a general-purpose analog front-end IC. Voltage measurement unit 21 includes a multiplexer and an A/D converter. The multiplexer outputs the voltage between two adjacent voltage lines to the A/D converter in order from the top. The A/D converter converts, into a digital value, an analog voltage to be input from the multiplexer.

Temperature measurement unit 22 includes a voltage dividing resistor and an A/D converter. The A/D converter sequentially converts, into digital values, a plurality of analog voltages divided by the plurality of temperature sensors T1 and T2 and a plurality of the voltage dividing resistors, and outputs the digital values to controller 24. Controller 24 estimates the temperatures of the plurality of cells E1 to En based on the digital values.

Current measurement unit 23 includes a differential amplifier and an A/D converter. The differential amplifier amplifies the voltage between both ends of shunt resistor Rs and outputs the amplified voltage to the A/D converter. The A/D converter converts, into a digital value, the analog voltage input from the differential amplifier, and outputs the digital value to controller 24. Controller 24 estimates a current flowing through the plurality of cells E1 to En based on the digital value.

When the A/D converter is mounted in controller 24 and an analog input port is installed in controller 24, temperature measurement unit 22 and current measurement unit 23 may output an analog voltage to controller 24, and the A/D converter in controller 24 may convert the analog voltage into a digital value.

Controller 24 manages the states of the plurality of cells E1 to En based on the voltages, the temperatures, and the currents of the plurality of cells E1 to En measured by voltage measurement unit 21, temperature measurement unit 22, and current measurement unit 23. Controller 24 can be configured by a microcomputer and a nonvolatile memory (for example, an electrically erasable programmable read-only memory (EEPROM) or a flash memory).

In an internal memory of the microcomputer, state of charge (SOC)-open circuit voltage (OCV) map 241 is held. SOC-OCV map 241 describes characteristic data of SOC-OCV curves of cells E1 to En. The SOC-OCV curves of cells E1 to En are created in advance based on characteristic tests by a battery manufacturer, and are registered in internal memory of the microcomputer at the time of shipment. The SOC-OCV map 241 may be registered in the nonvolatile memory. To estimate the SOC or the OCV of cells E1 to En with higher accuracy, the battery manufacturer may derive and map the SOC-OCV characteristic of cells E1 to En for each combination of a temperature category and a state of health (SOH) category. Instead of the map, a function using the SOC as an objective variable, the OCV, the temperature, and the degree of degradation as explanatory variables may be used.

Controller 24 can estimate the SOC and the SOH of each of the plurality of cells E1 to En. Controller 24 can estimate the SOC using an OCV method or a current integration method. The OCV method is a method of estimating the SOC based on the OCV of each of cells E1 to En measured by voltage measurement unit 21 and the characteristic data of the SOC-OCV curve described in SOC-OCV map 241. Then, OCV at a time point in the future is estimated based on voltage of each of cells E1 to En measured by voltage measurement unit 21, current of battery module M1 measured by current measurement unit 23, and temperature of battery module M1 measured by the temperature measurement unit 22. The current integration method is a method of estimating the SOC based on the OCV at the start of charging and discharging of each of cells E1 to En and the integrated value of the current measured by current measurement unit 23. In the current integration method, a measurement error of current measurement unit 23 accumulates as the charging and discharging time becomes longer. Thus, the SOC estimated with the current integration method is preferably corrected using the SOC estimated with the OCV method.

The SOH is defined as a ratio of current full charge capacity to initial full charge capacity, and a lower value (closer to 0%) indicates that degradation has progressed more. The SOH may be obtained by measuring the capacity through full charging and discharging, or may be obtained by adding storage degradation and cycle degradation. The storage degradation can be estimated based on the SOC, the temperature, and a storage degradation rate. The cycle degradation can be estimated based on the SOC range to be used, the temperature, the current rate, and the cycle degradation rate. The storage degradation rate and the cycle degradation rate can be derived preliminarily by an experiment or simulation. The SOC, the temperature, the SOC range, and the current rate can be obtained by measurement.

The SOH can also be estimated based on a correlation between the SOH and an internal resistance of the cell. The internal resistance can be estimated by dividing, by the current value, a voltage drop occurring when a predetermined current flows through the cell for a predetermined time. The internal resistance decreases as the temperature rises, and increases as the SOH decreases.

Controller 24 periodically transmits monitoring data including at least one of the voltage, the temperature, the current, the SOC, the SOH, and the internal resistance of each of the plurality of cells E1 to En included in battery pack 20 to management unit 30. Communication between controller 24 of battery pack 20 and management unit 30 may be, for example, serial communication conforming to RS-485 specifications. Controller 24 of battery pack 20 and management unit 30 may be connected to each other through a dedicated communication line, wireless communication, or power line communication.

Figure 3:
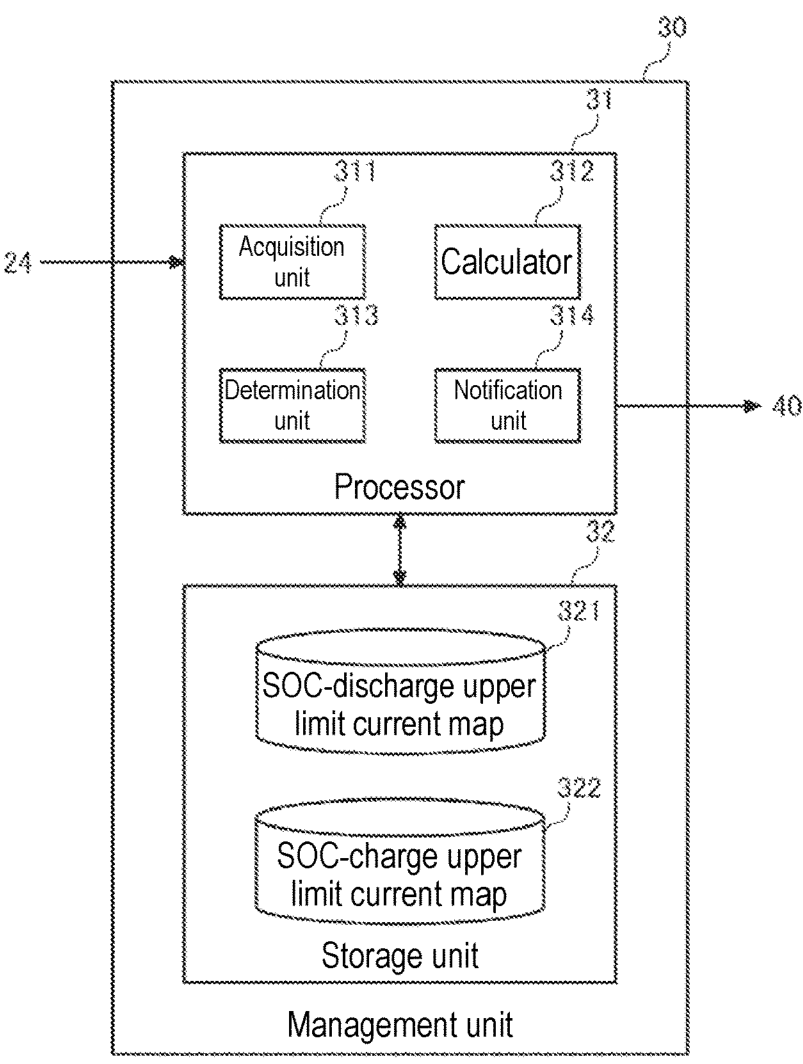
FIG. 3 is a view illustrating an example of an internal configuration of a management unit in FIG. 1.

FIG. 3 is a view illustrating an internal configuration example of management unit 30 of FIG. 1. Management unit 30 includes processor 31 and storage unit 32, and manages the plurality of battery packs 20*a* to 20*c*.

Processor 31 includes acquisition unit 311, calculator 312, determination unit 313, and notification unit 314. A function of processor 31 can be achieved by cooperation of a hardware resource and a software resource, or by the hardware resource alone. A CPU, a ROM, a RAM, a DSP, an ASIC, a FPGA, and other LSIs can be used as a hardware resource. As a software resource, a program such as firmware can be used.

Storage unit 32 includes a nonvolatile recording medium such as a flash memory. Storage unit 32 holds SOC-discharge upper limit current map 321 and SOC-charge upper limit current map 322. SOC-discharge upper limit current map 321 describes characteristic data of SOC-discharge upper limit current curves of cells E1 to En. The SOC-discharge upper limit current curves of cells E1 to En are created based on a characteristic test by a battery manufacturer. The SOC-discharge upper limit current curves are characteristic data in which the upper limit value of the discharge current which is allowed to be discharged from a cell is defined for each SOC from the viewpoint of cell protection and safety. In a general cell, as the SOC decreases, the upper limit value of the current allowed to be discharged decreases.

SOC-charge upper limit current map 322 describes characteristic data of SOC-charge upper limit current curves of cells E1 to En. The SOC-charge upper limit current curves of cells E1 to En are created based on a characteristic test by a battery manufacturer. The SOC-charge upper limit current curves are characteristic data in which the upper limit value of the charge current which is allowed to be charged into a cell is defined for each SOC from the viewpoint of cell protection and safety. In a general cell, as the SOC increases, the upper limit value of the current allowed to be charged decreases. In the present specification, the discharge current and the charge current are each considered with an absolute value for easy understanding of the description. In practice, the discharge current is usually defined to be positive and the charge current is usually defined to be negative.

At the time of discharging from a cell, a closed circuit voltage (CCV) decreases as the discharge current increases. The CCV of the cell at the time of discharging is defined by the following (Equation 1). At the time of charging a cell, the CCV increases as the charge current increases. The CCV of the cell at the time of charging is defined by the following (Equation 2).

$$\mathrm{CCVd}=\mathrm{OCV}-Id\times R \quad \text{(Equation 1)}$$

$$\mathrm{CCVc}=\mathrm{OCV}+Ic\times R \quad \text{(Equation 2)}$$

In the equations, Id indicates a discharge current, Ic indicates a charge current, and R indicates an internal resistance.

As expressed in the above (Equation 1), when the discharge current Id increases, the CCV decreases. When the CCV enters an overdischarge region, a load on the battery increases, which causes degradation. As expressed in the above (Equation 1), the lower the OCV, the lower the CCV. The OCV decreases as the SOC decreases, so that the upper limit value of the discharge current Id has to be defined to be lower as the SOC decreases. As expressed in the above (Equation 2), when the charge current Ic increases, the CCV increases. When the CCV enters an overcharge region, a load on the battery increases, which causes degradation. As expressed in the above (Equation 2), as the OCV increases, the CCV increases. The OCV increases as the SOC increases, so that the upper limit value of the charge current Ic has to be defined to be lower as the SOC increases.

SOC-discharge upper limit current characteristics of cells E1 to En depend on the temperature and the degree of degradation (SOH). The battery manufacturer derives and maps the SOC-discharge upper limit current characteristics of cells E1-En for each combination of a temperature category and a degree-of-degradation category. The SOC-discharge upper limit current characteristics are registered in controller 24 (e.g., in an internal memory of a microcomputer) of battery pack 20 at the time of shipment. When battery pack 20 is first attached to electric vehicle 1, management unit 30 of electric vehicle 1 acquires the SOC-discharge upper limit current characteristics from controller 24 of battery pack 20. Instead of the SOC-discharge upper limit current characteristics, SOC-discharge upper limit power characteristics may be used, or both of them may be used. The map may be replaced by a function using the discharge upper limit current or the discharge upper limit power as an objective variable, and the SOC, the temperature, and the degree of degradation as explanatory variables.

SOC-charge upper limit current characteristics of cells E1 to En also depend on the temperature and the degree of degradation (SOH). The battery manufacturer derives and maps the SOC-charge upper limit current characteristics of cells E1-En for each combination of a temperature category and a degree-of-degradation category. The SOC-charge upper limit current characteristics are registered in controller 24 (e.g., in an internal memory of a microcomputer) of battery pack 20 at the time of shipment. When battery pack 20 is first attached to electric vehicle 1, management unit 30 of electric vehicle 1 acquires the SOC-charge upper limit current characteristics from controller 24 of battery pack 20. Instead of the SOC-charge upper limit current characteristics, SOC-charge upper limit power characteristics may be used, or both of them may be used. For example, the upper limit value of the charge current from charger 2 may be controlled with reference to the SOC-charge upper limit current characteristics, and the upper limit value of the regenerative power from motor 60 may be controlled with reference to the SOC-charge upper limit power characteristics. The map may be replaced by a function using the charge upper limit current or the charge upper limit power as an objective variable, and the SOC, the temperature, and the degree of degradation as explanatory variables.

Figure 4:
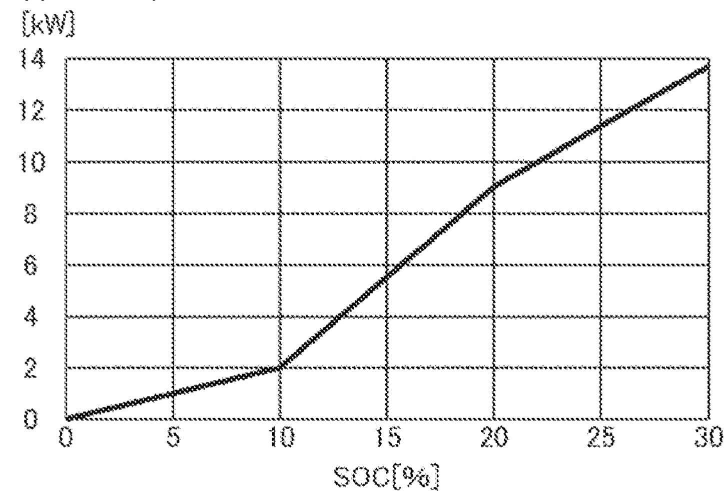
FIG. 4 is a graph illustrating an example of a state of charge (SOC)-discharge upper limit power characteristic at 0° C. of a certain battery pack.
Figure 5:
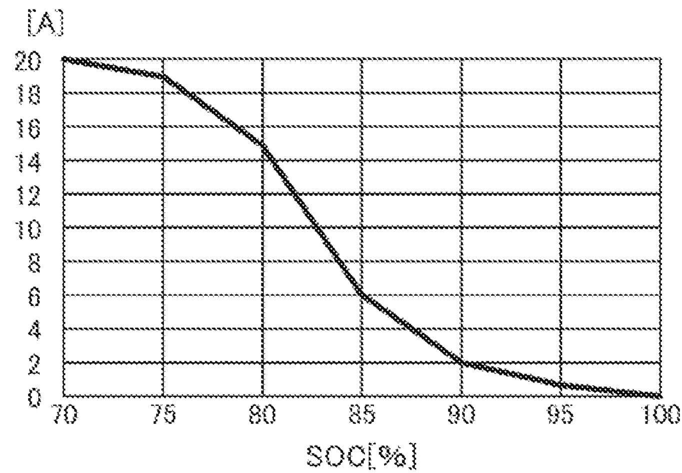
FIG. 5 is a graph illustrating an example of a state of charge (SOC)-charge upper limit current characteristics at 0° C. of a certain battery pack.

FIG. 4 is a graph illustrating an example of the SOC-discharge upper limit power characteristics at 0° C. of a certain battery pack. As illustrated in FIG. 4, the lower the SOC, the lower the discharge upper limit power. FIG. 5 is a graph illustrating an example of a state of charge (SOC)-charge upper limit current characteristics at 0° C. of a certain battery pack. As illustrated in FIG. 5, as the SOC increases, the discharge upper limit current decreases.

The description returns to FIG. 3. Acquisition unit 311 acquires monitoring data including at least the voltages and the SOCs of cells E-En from controller 24 of each battery pack 20. Calculator 312 estimates the SOC of each battery pack 20 based on the SOC of the plurality of cells E-En included in each battery pack 20. Normally, the SOC of the lowest cell is set as the SOC of the pack when the SOC is low, and the SOC of the highest cell is set as the SOC of the pack when the SOC is high. Calculator 312 may convert the SOC of the plurality of cells E-En included in battery pack 20 into a capacity to calculate the combined capacity of the plurality of cells E-En, and set the SOC corresponding to the combined capacity as the SOC of the pack.

As described above, in the present exemplary embodiment, pack relays RY1 connected to some of the plurality of battery packs 20*a*-20*c* are turned on, and pack relays RY1 connected to remaining battery packs 20 are turned off.

At the time of discharge, when one of pack relays RY1 in the off state (hereinafter, referred to as target pack relay RY1) is to be turned on, calculator 312 estimates an upper limit value of current or power allowed to be discharged from the entire plurality of battery packs 20 (hereinafter, referred to as a parallel system) with target pack relay RY1 being turned on.

Determination unit 313 compares the upper limit value (hereinafter, referred to as a predicted upper limit value) estimated by calculator 312 with the first threshold based on the maximum value of the current or power required by the load (mainly motor 60). The first threshold may be set to the same value as the maximum value of the current or power required for the load, or may be set to a value lower than the maximum value of the current or power required for the load (under loose conditions) based on past travel data on electric vehicle 1. For example, when the past travel data shows that electric vehicle 1 has traveled at 80% or less of the maximum value of the power required for the load for 95% or more of traveling time, vehicle ECU 40 may set a value of 80% of the maximum value of the power required for the load as the first threshold. Vehicle ECU 40 sets the first threshold in management unit 30 of power supply system 10.

Determination unit 313 permits target pack relay RY1 to be turned on when the predicted upper limit value is greater than or equal to the first threshold, and does not permit target pack relay RY1 to be turned on when the predicted upper limit value is lower than the first threshold. When determination unit 313 permits target pack relay RY1 to be turned on, relay drive unit 25 turns on target pack relay RY1.

Determination unit 313 also compares the upper limit value (hereinafter, referred to as a predicted upper limit value) estimated by calculator 312 with a second threshold based on an upper limit value (hereinafter, referred to as a current upper limit value) of the current or power allowed to be discharged from the parallel system before target pack relay RY1 is turned on. The second threshold may be the same value as the current upper limit value (adjustment value $\alpha=0$), may be a value obtained by adding the adjustment value a to the current upper limit value, or may be a value obtained by subtracting the adjustment value a from the current upper limit value. Designers can set the adjustment value a in consideration of the number of parallel battery packs 20, application, and the like. Determination unit 313 permits target pack relay RY1 to be turned on when the predicted upper limit value is greater than or equal to the second threshold, and does not permit target pack relay RY1 to be turned on when the predicted upper limit value is lower than the second threshold. When determination unit 313 permits target pack relay RY1 to be turned on, relay drive unit 25 turns on target pack relay RY1.

Notification unit 314 notifies vehicle ECU 40 of the upper limit value of the current or power allowed to be discharged from the parallel system (hereinafter, referred to as a discharge upper limit current value or a discharge upper limit power value of the entire parallel system, or a discharge upper limit value thereof when both are collectively referred). Management unit 30 and vehicle ECU 40 are connected by an in-vehicle network. For example, a controller area network (CAN) or a local interconnect network (LIN) can be used as the in-vehicle network. Vehicle ECU 40 sets, in inverter 50, the discharge upper limit current value or the discharge upper limit power value of the entire parallel system received from management unit 30. Inverter 50 controls the output current or output power to be supplied to motor 60 within a range of the set discharge upper limit current value or discharge upper limit power value.

At the time of charge, when target pack relay RY1 is to be turned on, calculator 312 estimates the upper limit value of the current or the power permitted to be charged to the parallel system when target pack relay RY1 is turned on.

The determination unit 313 compares the predicted upper limit value, under which the parallel system is permitted to be charged when target pack relay RY1 is turned on, with a third threshold based on the maximum value of the current or power allowed to be output by the power source. During traveling, the third threshold may be set to the same value as the maximum value of the current or power that can be regenerated from motor 60, or may be set to a value lower than the maximum value (under loose conditions) of the current or power that can be regenerated from motor 60 based on the past travel data on electric vehicle 1. For example, when the past travel data shows that electric vehicle 1 has regenerated power at 80% or less of the maximum value of power that can be regenerated from motor 60 for 95% or more of total regeneration time, vehicle ECU 40 may set a value of 80% of the maximum value of the power that can be regenerated from motor 60 as the third threshold. During charge from charger 2, the third threshold is set to the maximum value of the current or power allowed to be output from charger 2.

Determination unit 313 permits target pack relay RY1 to be turned on when the predicted upper limit value is greater than or equal to the third threshold, and does not permit target pack relay RY1 to be turned on when the predicted upper limit value is lower than the third threshold. When determination unit 313 permits target pack relay RY1 to be turned on, relay drive unit 25 turns on target pack relay RY1.

The determination unit 313 also compares the predicted upper limit value with a fourth threshold based on the current upper limit value before target pack relay RY1 is turned on. The fourth threshold may be the same value as the current upper limit value (adjustment value $\alpha=0$), may be a value obtained by adding the adjustment value a to the current upper limit value, or may be a value obtained by subtracting the adjustment value $\alpha$ from the current upper limit value. Designers can set the adjustment value $\alpha$ in consideration of the number of parallel battery packs 20, application, and the like. Determination unit 313 permits target pack relay RY1 to be turned on when the predicted upper limit value is greater than or equal to the fourth threshold, and does not permit target pack relay RY1 to be turned on when the predicted upper limit value is lower than the fourth threshold.

Notification unit 314 notifies vehicle ECU 40 of the upper limit value of the current or power allowed to be charged from the parallel system (hereinafter, referred to as a charge upper limit current value or a charge upper limit power value of the entire parallel system, or a charge upper limit value thereof when both are collectively referred). Vehicle ECU 40 controls the regenerative current or the regenerative power generated by motor 60 within the range of the charge upper limit current value or the charge upper limit power value of the entire parallel system received from management unit 30. For example, when the regenerative power value due to regenerative braking reaches the charge upper limit power value of the entire parallel system, vehicle ECU 40 switches braking from the regenerative braking to mechanical braking. In the mechanical braking, regenerative energy is converted into heat energy. When quick charging is performed with a direct current from charger 2, notification unit 314 notifies charger 2 of the charge upper limit current value or the charge upper limit power value of the entire parallel system.

Basically, as the number of parallel battery packs 20 increases, the discharge upper limit value and the charge upper limit value of the entire parallel system increase. However, even when battery pack 20 is added to the parallel system, the discharge upper limit value and the charge upper limit value of the entire parallel system may not increase. This is the case where a cross current is generated between the plurality of battery packs 20 due to the connection of unconnected battery pack 20.

Figure 6:
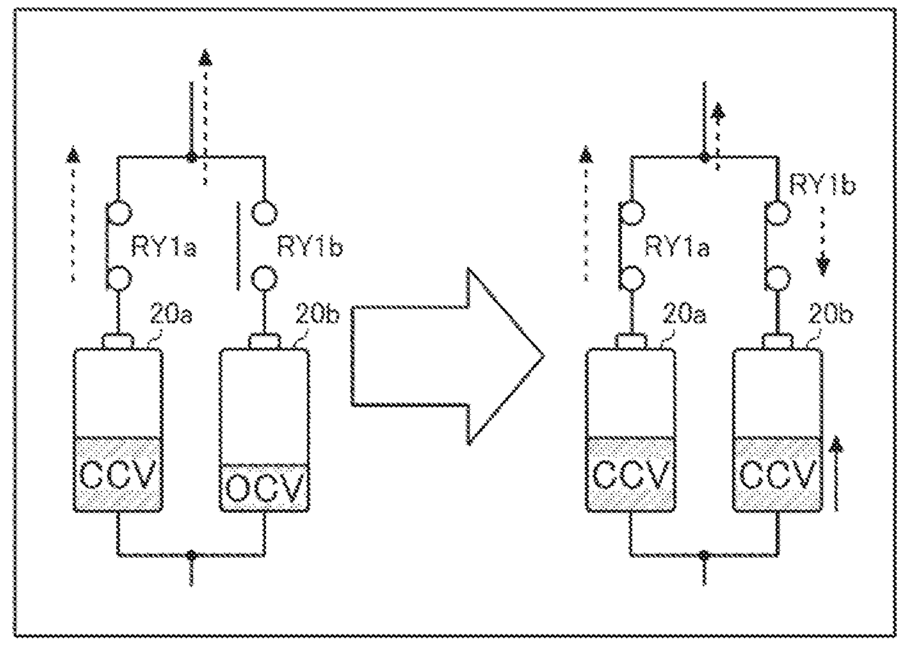
FIG. 6 is a view illustrating a cross current between battery packs during discharge.

FIG. 6 is a view illustrating a cross current between battery packs 20 during discharge. FIG. 6 illustrates the parallel connection of two battery packs 20 for easy understanding of the description. A state on a left side of FIG. 6 is a state where first pack relay RY1 connected to first battery pack 20*a* is turned on, second pack relay RY1 connected to second battery pack 20*b* is turned off, and the current is supplied to the load only from first battery pack 20*a*. In this case, the discharge upper limit current value of the entire parallel system matches the discharge upper limit current value of first battery pack 20*a*.

A state on a right side of FIG. 6 is a view illustrating a state after turning-on of second pack relay RY1. When the OCV of second battery pack 20*b* is lower than the CCV in the case of discharging from first battery pack 20*a* at the discharge upper limit current value, a cross current is generated from first battery pack 20*a* to second battery pack 20*b*. As a result, the current discharged from first battery pack 20*a* is branched into the load and second battery pack 20*b*, and the discharge upper limit current value of the entire parallel system decreases. When motor 60 of electric vehicle 1 rotates around the discharge upper limit current value, unintended deceleration may occur due to the decrease in the discharge upper limit current value.

The CCV in a case of discharging from first battery pack 20*a* at the discharge upper limit current value is an estimated value. The current discharged from the first battery pack 20*a* fluctuates due to load fluctuation, and the CCV of first battery pack 20*a* fluctuates in accordance with the fluctuation of the discharge current. The CCV in the case of discharging from first battery pack 20*a* at the discharge upper limit current value is a value indicating the minimum voltage at the time of discharging from first battery pack 20*a*.

Next, a case where second pack relay RY1 is turned on when the CCV in the case of discharging from first battery pack 20*a* at the discharge upper limit current value matches the OCV of second battery pack 20*b* will be considered. When the current actually discharged from first battery pack 20*a* to the load matches the discharge upper limit current value of first battery pack 20*a*, the CCV of first battery pack 20*a* is equal to the OCV of second battery pack 20*b*. In this case, no cross current is generated between first battery pack 20*a* and second battery pack 20*b*, and the discharge upper limit current value of the entire parallel system does not decrease.

When the current actually discharged from first battery pack 20*a* to the load is lower than the discharge upper limit current value of first battery pack 20*a*, the actual CCV of first battery pack 20*a* is higher than the CCV in the case of discharge at the discharge upper limit current value. In this case, a cross current is generated from first battery pack 20*a* to second battery pack 20*b*. However, the cross current stops when a consumption current of the load increases to the discharge upper limit current value of first battery pack 20*a*, and thus the discharge upper limit current value of the entire parallel system does not decrease.

Next, a case where second pack relay RY1 is turned on when the OCV of second battery pack 20*b* is higher than the CCV in the case of discharging from first battery pack 20*a* at the discharge upper limit current value will be considered. The discharge upper limit current value of second battery pack 20*b* is greater than the discharge upper limit current value of first battery pack 20*a*, so that the discharge upper limit current value of the entire parallel system does not decrease when second pack relay RY1 is turned on.

The above description shows the example in which both the discharge upper limit current value of each battery pack 20 and the discharge upper limit current value of the entire parallel system are calculated by calculator 312 of management unit 30. In this regard, the discharge upper limit current value of battery pack 20 may be calculated by controller 24 in battery pack 20. Controller 24 in each battery pack 20 transmits the calculated discharge upper limit current value of battery pack 20 to management unit 30. Calculator 312 of management unit 30 calculates the discharge upper limit current value of the entire parallel system based on the discharge upper limit current values received from the plurality of battery packs 20.

Hereinafter, two examples of processing for determining whether to permit parallel connection of target pack relay RY1 during discharge will be described. Example 1 is dynamic determination processing, and Example 2 is static determination processing.

Figure 7:
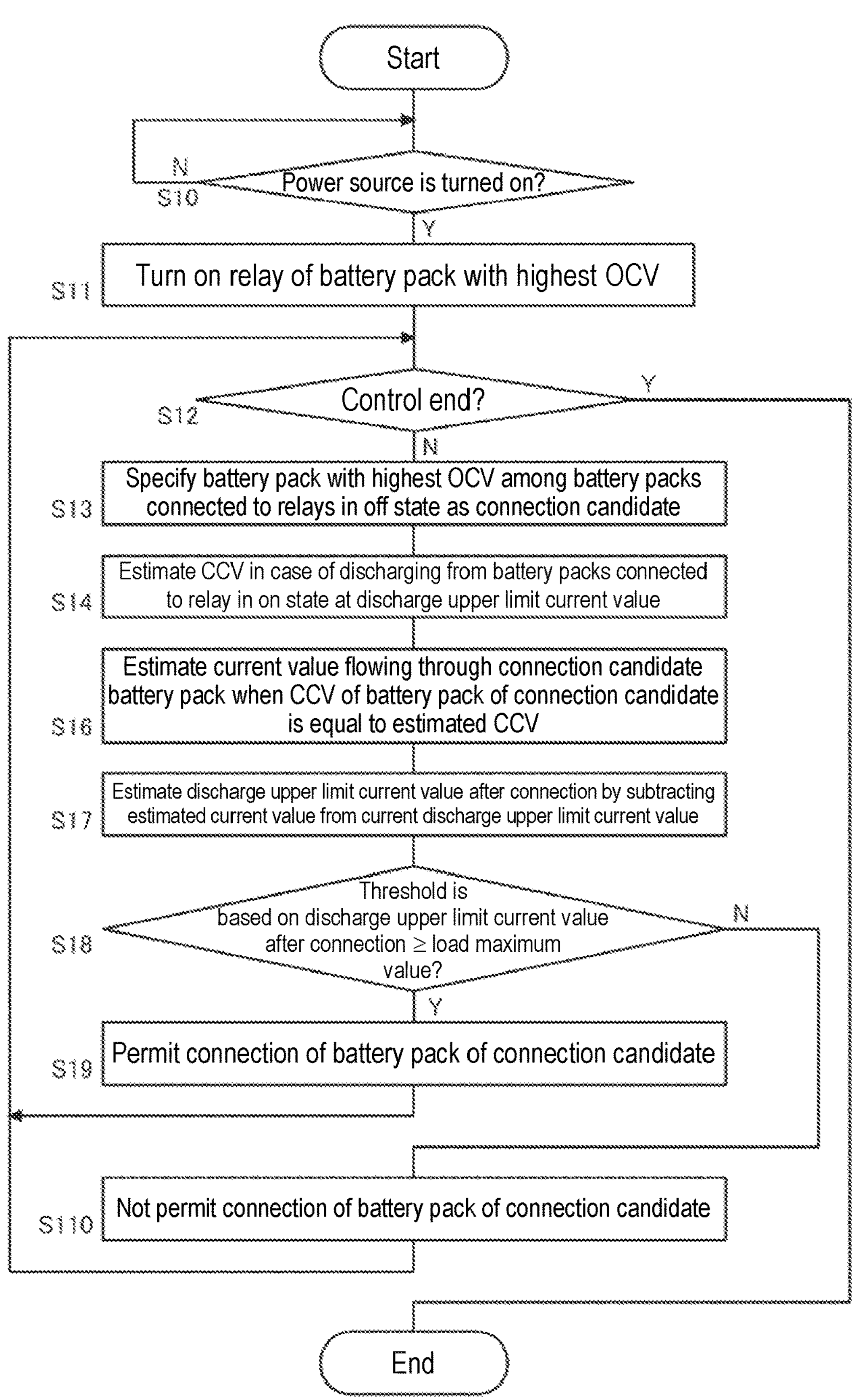
FIG. 7 is a flowchart illustrating processing for determining parallel connection according to Example 1.

FIG. 7 is a flowchart for describing the processing for determining parallel connection according to Example 1. When the power source of electric vehicle 1 is turned on (corresponding to ignition on of an engine vehicle) (Y in S10), determination unit 313 causes relay drive unit 25 to turn on pack relay RY1 connected to battery pack 20 with the highest OCV among the plurality of battery packs 20 (S11). When a plurality of battery packs 20 has the highest OCV, determination unit 313 simultaneously turns on the plurality of pack relays RY1 connected to the plurality of battery packs 20.

While parallel connection control is performed (N in S12), the following processing is performed. Determination unit 313 specifies battery pack 20 with the highest OCV among battery packs 20 connected to pack relays RY1 in the off state as a connection candidate where pack relay RY1 has to be next turned on (S13).

Based on the SOC of battery pack 20 connected to pack relay RY1 in the on state, calculator 312 refers to SOC-discharge upper limit current map 321 to derive the discharge upper limit current value of battery pack 20. Calculator 312 applies the OCV, the internal resistance, and the discharge upper limit current value of battery pack 20 to the above (Equation 1) to estimate the CCV corresponding to the discharge upper limit current value of battery pack 20 (S14). In deriving the SOC, the internal resistance, and the discharge upper limit current value of battery pack 20, calculator 312 uses at least the temperature and the SOH of battery pack 20 as parameters.

Calculator 312 estimates a current value flowing through battery pack 20 of the connection candidate (S16) when the CCV of battery pack 20 of the connection candidate is equivalent to (is substantially equal to) the CCV when the connected battery pack 20 discharges at the discharge upper limit current value.

The current value flowing through the load at present is used. The current value actually flowing through the load is usually lower than the discharge upper limit current value, so that the CCV of connected battery pack 20 is higher than the CCV in the case of discharge at the discharge upper limit current value by voltage corresponding to a current difference between that in the load and the discharge upper limit current value. Calculator 312 calculates a difference voltage between the actual CCV of connected battery pack 20 and the CCV of battery pack 20 of the connection candidate (=CCV when connected battery pack 20 discharges at the discharge upper limit current value), and estimates the current value flowing through battery pack 20 of the connection candidate based on the difference voltage and internal resistance of battery pack 20 of the connection candidate. This current value is a cross current value flowing from connected battery pack 20 to battery pack 20 of the connection candidate.

Calculator 312 estimates the discharge upper limit current value of the entire parallel system after battery pack 20 of the connection candidate is connected by subtracting the estimated current value (cross current value) from the discharge upper limit current value of the entire parallel system before battery pack 20 of the connection candidate is connected (S17).

Determination unit 313 compares the estimated discharge upper limit current value after the connection with a threshold based on the maximum value of the current required by the load (S18). When the discharge upper limit current value after the connection is larger than or equal to the threshold (Y in S18), the determination unit 313 permits the connection of battery pack 20 of the connection candidate (S19), and causes relay drive unit 25 to turn on pack relay RY1 connected to battery pack 20 of the connection candidate. The processing proceeds to step S12. When the discharge upper limit current value after the connection is lower than the threshold (N in S18), determination unit 313 does not permit connection of battery pack 20 of the connection candidate (S110). The processing proceeds to step S12.

When pack relay RY1 is turned on in the plurality of battery packs 20, the CCVs corresponding to the discharge upper limit current values of the plurality of battery packs 20 are identical to each other. In a state where the CCVs are identical to each other, calculator 312 estimates the CCVs corresponding to the discharge upper limit current values of the plurality of battery packs 20 turned on.

Figure 8:
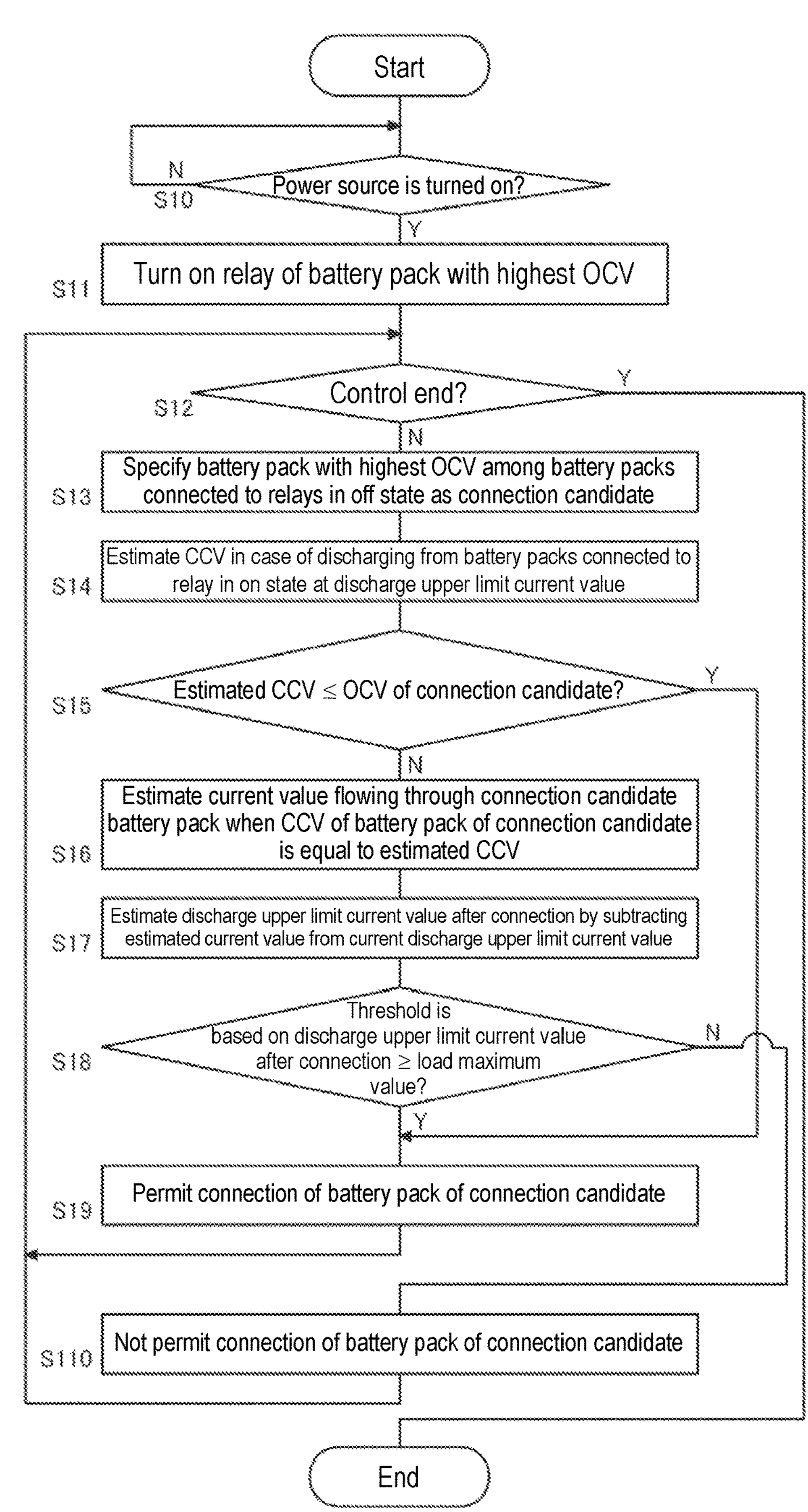
FIG. 8 is a flowchart illustrating processing for determining parallel connection according to an application example of Example 1.

FIG. 8 is a flowchart illustrating processing for determining parallel connection according to an application example of Example 1. The flowchart according to the application example of Example 1 illustrated in FIG. 8 is obtained by adding the processing of step S15 to the flowchart according to a basic example of Example 1 illustrated in FIG. 7.

In step S15, determination unit 313 compares the CCV estimated when connected battery pack 20 discharges at the discharge upper limit current value with the OCV of battery pack 20 of the connection candidate (S15). When the estimated CCV is less than or equal to the OCV of battery pack 20 of the connection candidate (Y in S15), determination unit 313 permits the connection of battery pack 20 of the connection candidate (S19), and causes relay drive unit 25 to turn on pack relay RY1 connected to battery pack 20 of the connection candidate. The processing proceeds to step S12. When the estimated CCV is higher than the OCV of battery pack 20 of the connection candidate in step S15 (N in S15), the processing proceeds to step S16.

The application example enables calculation processing in steps S16 to S18 to be skipped when the CCV estimated when connected battery pack 20 discharges at the discharge upper limit current value is less than or equal to the OCV of battery pack 20 of the connection candidate, and thus enables reducing the amount of calculation.

Next, Example 2 of processing for determining parallel connection during discharge will be described. As described above, when the OCVs among the plurality of battery packs 20 connected in parallel are not uniform, a cross current is generated from battery pack 20 with a high OCV to battery pack 20 with a low OCV. Due to the cross current, the OCV of battery pack 20 with a high OCV decreases, and the OCV of battery pack 20 with a low OCV increases. When the voltage does not differ therebetween, the cross current stops. In the state where the cross current stops, the OCVs among the plurality of battery packs 20 connected in parallel are uniform.

Figure 9:
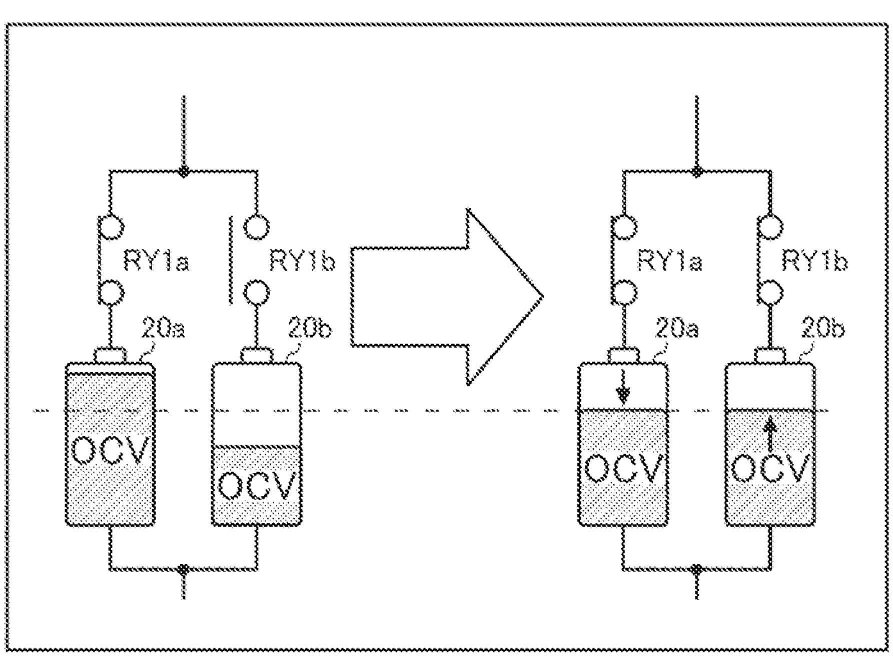
FIG. 9 is a view illustrating a cross current between battery packs and convergence of an open circuit voltage (OCV) during discharge.

FIG. 9 is a view illustrating a cross current between battery packs 20 and convergence of an open circuit voltage (OCV) during discharge. FIG. 9 illustrates the parallel connection of two battery packs 20 for easy understanding of the description. A state on a left side in FIG. 9 is a state where first pack relay RY1 connected to first battery pack 20*a* is turned on, second pack relay RY1 connected to second battery pack 20*b* is turned off, and the OCV of first battery pack 20*a* is higher than the OCV of second battery pack 20*b*.

A state on a right side in FIG. 9 illustrates a state after turning-on of second pack relay RY1. When first battery pack 20*a* and second battery pack 20*b* are conducted, a current flows from first battery pack 20*a* to second battery pack 20*b*, the OCV of first battery pack 20*a* decreases, and the OCV of second battery pack 20*b* increases. Eventually, when both the OCVs are uniform, the cross current from first battery pack 20*a* to second battery pack 20*b* stops.

The OCV of each of first battery pack 20*a* and second battery pack 20*b* when the cross current stops becomes an average SOC of SOCs of first battery pack 20*a* and second battery pack 20*b* before the cross current is generated under an ideal condition where pack capacities and the like are uniform, and thus the OCV when the cross current stops becomes the OCV corresponding to the average SOC. Even when three or more battery packs 20 having non-uniform OCVs are connected in parallel, the OCVs of three or more battery packs 20 are uniform due to the cross current under the ideal condition. In this case, the OCVs of three or more battery packs 20 after the OCVs are uniform become an average value of the OCVs of three or more battery packs 20 before the generation of the cross current.

In Example 2, calculator 312 estimates the discharge upper limit current value of the entire parallel system at the time of convergence of the OCVs after connection of unconnected battery pack 20 to the parallel system. Determination unit 313 permits connection of unconnected battery pack 20 when the estimated discharge upper limit current value is larger than or equal to a threshold based on the maximum value of the current required by the load. Determination unit 313 does not permit connection of unconnected battery pack 20 when the estimated discharge upper limit current value is lower than the threshold based on the maximum value of the current required by the load. Determination unit 313 also permits the connection of unconnected battery pack 20 when the estimated discharge upper limit current value is greater than or equal to the discharge upper limit current value of the entire parallel system before unconnected battery pack 20 is connected to the parallel system.

Determination unit 313 does not permit the connection of unconnected battery pack 20 when the estimated discharge upper limit current value is lower than the discharge upper limit current value of the entire parallel system before unconnected battery pack 20 is connected to the parallel system.

Figure 10:
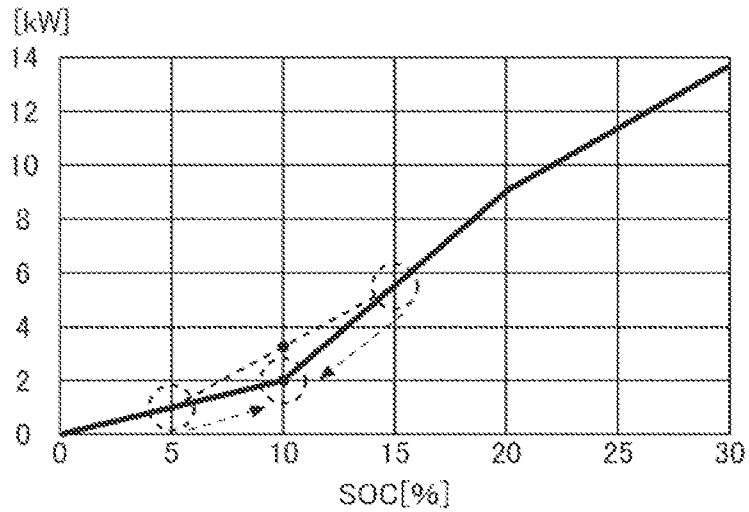
FIG. 10 is a graph illustrating an example of a change in a discharge upper limit power value of an entire parallel system before and after connection of an unconnected battery pack during discharge.

FIG. 10 is a graph illustrating an example of a change in a discharge upper limit power value of an entire parallel system before and after connection of unconnected battery pack 20 during discharge. For example, a state where first battery pack 20*a* is connected to the load and second battery pack 20*b* is not connected to the load as in the state on the left side in FIG. 9 will be considered. Hereinafter, a battery pack using the same type of cells will be described on the premise that conditions regarding pack capacity, SOH, and temperature are the same. First battery pack 20*a* has a SOC of 15%, and second battery pack 20*b* has a SOC of 5%. Referring to the SOC-discharge upper limit power characteristics illustrated in FIG. 10, the discharge upper limit power value is 5.8 kW when the SOC is 15%. Similarly, the discharge upper limit power value of the entire parallel system to which only first battery pack 20*a* is connected is 5.8 kW.

Next, a state after connection of second battery pack 20*b* to the parallel system as in the state on the right side in FIG. 9 will be considered. When second battery pack 20*b* is connected to the parallel system, a cross current is generated from first battery pack 20*a* to second battery pack 20*b*. Due to the cross current, the SOC of first battery pack 20*a* decreases, and the SOC of second battery pack 20*b* increases. When both the SOCs reach 15%, the cross current stops. Referring to the SOC-discharge upper limit power characteristics illustrated in FIG. 10, the discharge upper limit power value is 2.0 kW when the SOC is 10%. Thus, the discharge upper limit power value of the entire parallel system in a state where first battery pack 20*a* and second battery pack 20*b* are connected is 4.0 kW (=2.0 kW×2).

In this example, when second battery pack 20*b* is connected, the discharge upper limit power value of the entire parallel system decreases from 5.8 kW to 4.0 kW. As illustrated in FIG. 10, when a discharge upper limit power value in a state where the SOCs are uniform (SOC=10%) is present below an imaginary line obtained by connecting the discharge upper limit power value (5.8 kW) of first battery pack 20*a* and the discharge upper limit power value (1.0 kW) of second battery pack 20*b* before connection of second battery pack 20*b*, the discharge upper limit power value of the entire parallel system is lower than a power value obtained by simply averaging the discharge upper limit power value (5.8 kW) of first battery pack 20*a* and the discharge upper limit power value (1.0 kW) of second battery pack 20*b* before the connection. Thus, when the discharge upper limit power value of the entire parallel system after the second battery pack 20*b* is connected is estimated without referring to the SOC-discharge upper limit power characteristics, a state may occur in which the discharge upper limit power value is excessively estimated and an actual discharge upper limit power value becomes lower than the power required by the load.

Figure 11:
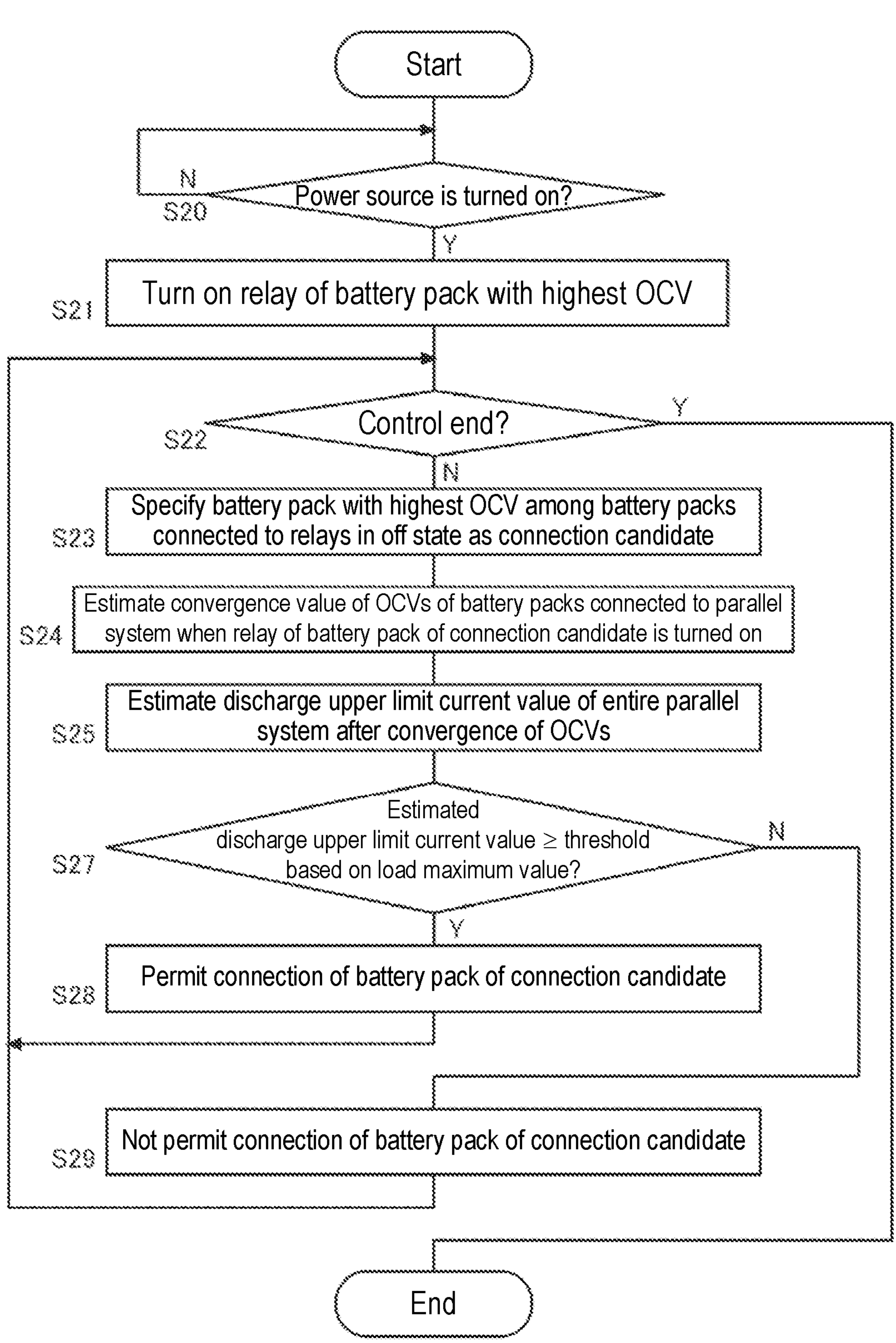
FIG. 11 is a flowchart illustrating processing for determining parallel connection according to Example 2.

FIG. 11 is a flowchart for describing the processing for determining parallel connection according to Example 2. When the power source of electric vehicle 1 is turned on (Y in S20), determination unit 313 causes relay drive unit 25 to turn on pack relay RY1 connected to battery pack 20 with the highest OCV among the plurality of battery packs 20 (S21). When a plurality of battery packs 20 has the highest OCV, determination unit 313 simultaneously turns on the plurality of pack relays RY1 connected to the plurality of battery packs 20.

When battery pack 20 where pack relay RY1 is in the off state is present while the parallel connection control is being executed (N in S22), the following processing is performed. Determination unit 313 specifies battery pack 20 with the highest OCV among battery packs 20 connected to pack relays RY1 in the off state as a connection candidate where pack relay RY1 is to be turned on next (S23).

Calculator 312 estimates a convergence value of the OCVs of the plurality of battery packs 20 connected to the parallel system when battery pack 20 as the connection candidate is turned on (S24). Calculator 312 refers to SOC-discharge upper limit current map 321 to derive the discharge upper limit current value of one battery pack 20 based on an SOC corresponding to the converged OCV. Calculator 312 multiplies the discharge upper limit current value of one battery pack 20 by the parallel number to estimate the discharge upper limit current value of the entire parallel system (S25). In deriving the SOC and the discharge upper limit current value of battery pack 20, calculator 312 uses at least the temperature and the SOH of battery pack 20 as parameters.

Determination unit 313 compares the estimated discharge upper limit current value of the entire parallel system with the threshold based on the maximum value of the current required by the load (S27). When the estimated discharge upper limit current value is larger than or equal to the threshold (Y in S27), the determination unit 313 permits the connection of battery pack 20 of the connection candidate (S28), and causes relay drive unit 25 to turn on pack relay RY1 connected to battery pack 20 of the connection candidate. When the estimated discharge upper limit current value is lower than the threshold (N in S27), determination unit 313 does not permit connection of battery pack 20 of the connection candidate (S29). The processing proceeds to step S22.

Figure 12:
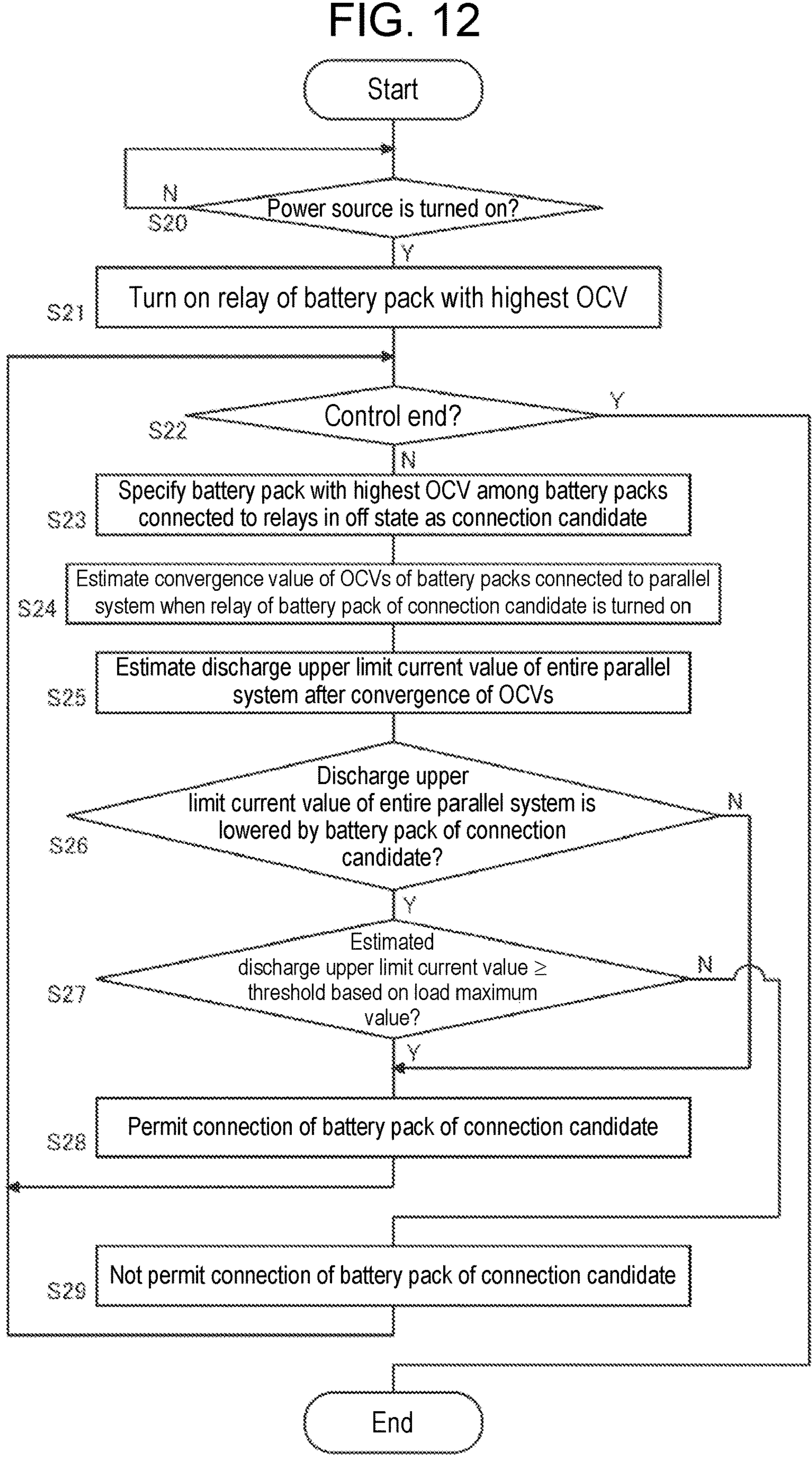
FIG. 12 is a flowchart illustrating processing for determining parallel connection according to a modified example of Example 2.

FIG. 12 is a flowchart illustrating processing for determining parallel connection according to a modified example of Example 2. The flowchart according to a modified example of Example 2 illustrated in FIG. 12 is obtained by adding the processing of step S26 to the flowchart according to a basic example of Example 2 illustrated in FIG. 11.

In step S26, determination unit 313 determines whether the estimated discharge upper limit current value of the entire parallel system decreases due to the connection of battery pack 20 of the connection candidate (S26). When the discharge upper limit current value of the entire parallel system does not decrease (N in S26), determination unit 313 permits the connection of battery pack 20 as the connection candidate (S28), and causes relay drive unit 25 to turn on pack relay RY1 connected to battery pack 20 as the connection candidate. When the discharge upper limit current value of the entire parallel system decreases (Y in S26), the processing proceeds to step S27.

The modified example enables standby time of battery pack 20 to be reduced by permitting the connection of the unconnected battery pack 20 having no problem in practical use even when the discharge upper limit power value decreases under a basic criterion for determining whether the discharge upper limit power value of the entire parallel system does not decrease after the connection of the unconnected battery pack 20.

Examples 1, 2 each described above prohibits connection of unconnected battery pack 20 when the discharge upper limit current value or the discharge upper limit power value of the entire parallel system due to the connection of unconnected battery pack 20 is lower than the threshold based on the maximum value of the current or power required by the load. This configuration enables preventing shortage of current supplied from the parallel system to the load, and thus enables preventing occurrence of an adverse effect such as deterioration in acceleration performance of electric vehicle 1.

Figure 13:
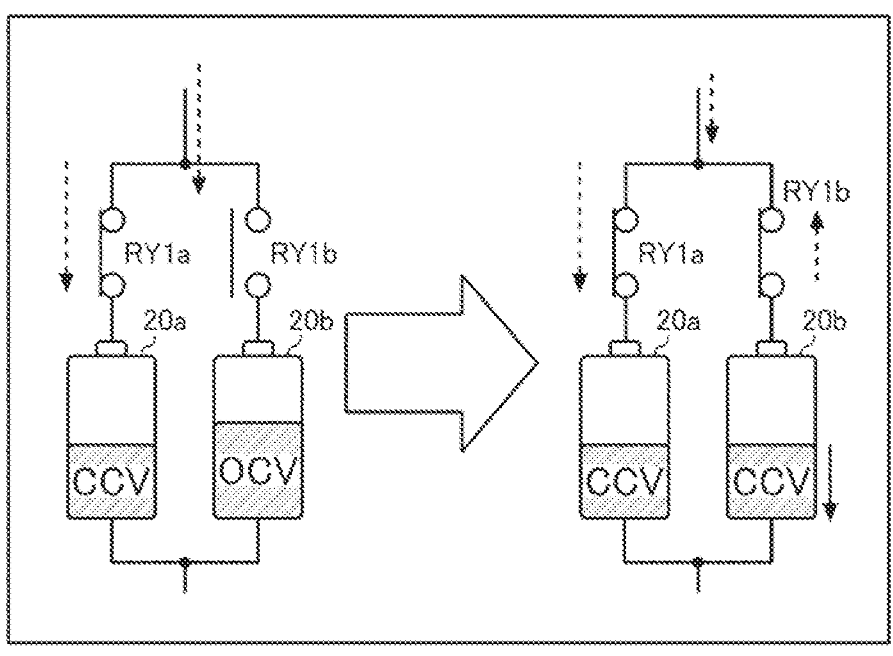
FIG. 13 is a view illustrating a cross current between battery packs during charge.

FIG. 13 is a view illustrating a cross current between battery packs 20 during charge. FIG. 13 illustrates the parallel connection of two battery packs 20 for easy understanding of the description. A state on a left side of FIG. 13 is a state where first pack relay RY1 connected to first battery pack 20*a* is turned on, second pack relay RY1 connected to second battery pack 20*b* is turned off, and a current is supplied from a power source (e.g., charger 2) only to first battery pack 20*a*. In this case, the charge upper limit current value of the entire parallel system matches the charge upper limit current value of first battery pack 20*a*.

A state on a right side of FIG. 13 is a view illustrating a state after turning-on of second pack relay RY1. When the OCV of second battery pack 20*b* is higher than the CCV in the case of charging first battery pack 20*a* at the charge upper limit current value, a cross current is generated from second battery pack 20*b* to first battery pack 20*a*. As a result, the charge upper limit current value of first battery pack 20*a* does not change, but the current that can be charged into first battery pack 20*a* from the power supply decreases, and thus the charge upper limit current value of the entire parallel system viewed from the power supply decreases. When charging is performed with the maximum current from charger 2, control in charger 2 may stop the charging.

The CCV in a case of charging first battery pack 20*a* at the charge upper limit current value is an estimated value. The current charging the first battery pack 20*a* fluctuates due to fluctuation of power source voltage or the like, and the CCV of first battery pack 20*a* fluctuates in accordance with the fluctuation of the charge current. The CCV in the case of charging first battery pack 20*a* at the charge upper limit current value is a value indicating the maximum voltage at the time of charging first battery pack 20*a*.

Next, a case where second pack relay RY1 is turned on when the CCV in the case of charging first battery pack 20*a* at the charge upper limit current value matches the OCV of second battery pack 20*b* will be considered. When the current actually charging first battery pack 20*a* from the power source matches the charge upper limit current value of first battery pack 20*a*, the CCV of first battery pack 20*a* is equal to the OCV of second battery pack 20*b*. In this case, no cross current is generated between first battery pack 20*a* and second battery pack 20*b*, and the charge upper limit current value of the entire parallel system does not decrease.

When the current actually charging first battery pack 20*a* from the power source is lower than the charge upper limit current value of first battery pack 20*a*, the actual CCV of first battery pack 20*a* is lower than the CCV in the case of charging first battery pack 20*a* at the charge upper limit current value. In this case, a cross current is generated from second battery pack 20*b* to first battery pack 20*a*. However, the cross current stops when an output current from the power source increases to the charge upper limit current value of first battery pack 20*a*, and thus the charge upper limit current value of the entire parallel system does not decrease.

Next, a case where second pack relay RY1 is turned on when the OCV of second battery pack 20*b* is lower than the CCV in the case of charging first battery pack 20*a* at the charge upper limit current value will be considered. The charge upper limit current value of second battery pack 20*b* is greater than the charge upper limit current value of first battery pack 20*a*, so that the charge upper limit current value of the entire parallel system does not decrease when second pack relay RY1 is turned on.

The above description shows the example in which both the discharge upper limit current value of each battery pack 20 and the charge upper limit current value of the entire parallel system are calculated by calculator 312 of management unit 30. In this regard, the charge upper limit current value of battery pack 20 may be calculated by controller 24 in battery pack 20. Controller 24 in each battery pack 20 transmits the calculated charge upper limit current value of battery pack 20 to management unit 30. Calculator 312 of management unit 30 calculates the charge upper limit current value of the entire parallel system based on the charge upper limit current values received from the plurality of battery packs 20.

Hereinafter, two examples of processing for determining whether to permit parallel connection of target pack relay RY1 during charge will be described. Example 3 is dynamic determination processing, and Example 4 is static determination processing.

Figure 14:
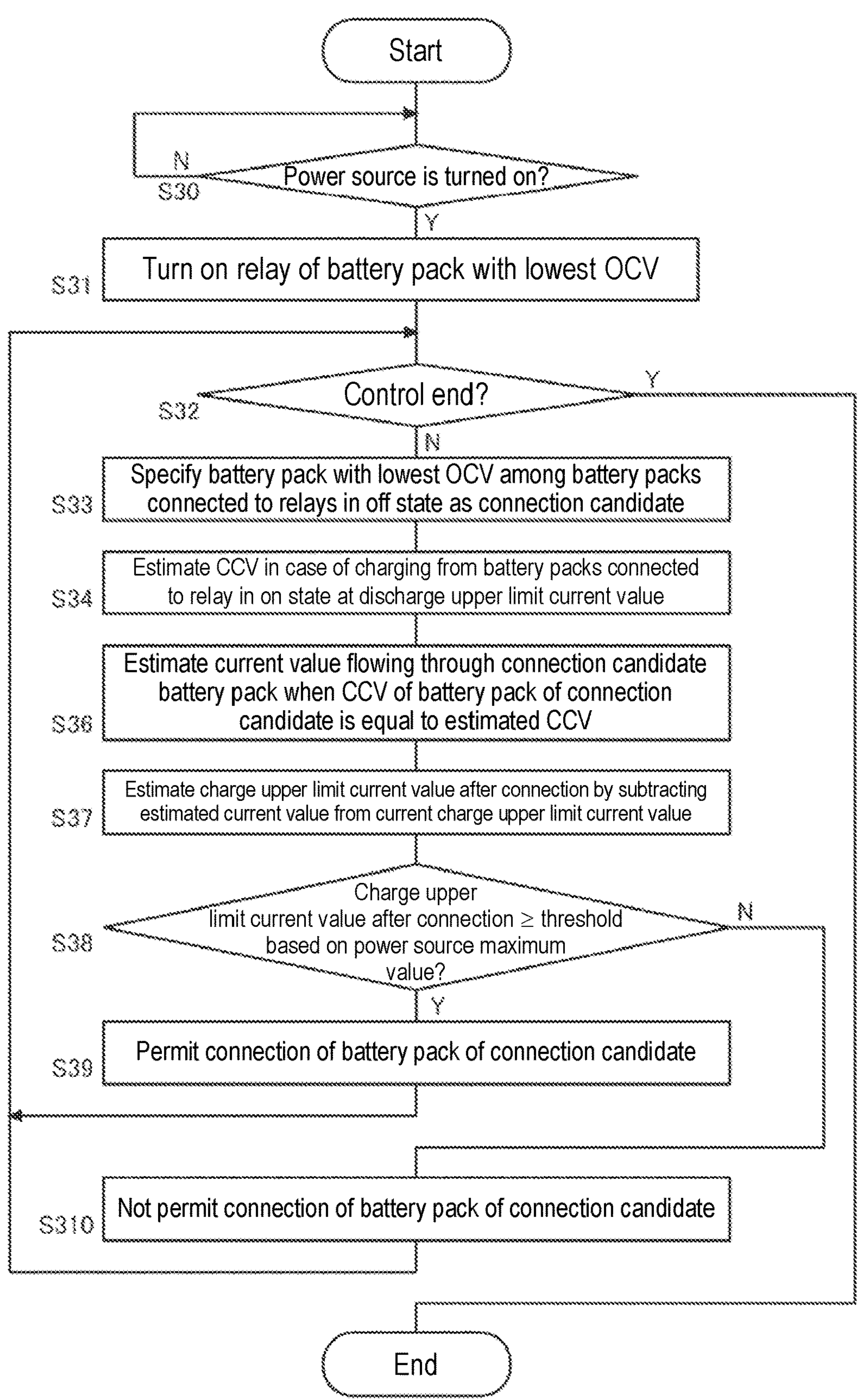
FIG. 14 is a flowchart illustrating processing for determining parallel connection according to Example 3.

FIG. 14 is a flowchart for describing the processing for determining parallel connection according to Example 3. When the power source of electric vehicle 1 is turned on (corresponding to ignition on of an engine vehicle) (Y in S30), determination unit 313 causes relay drive unit 25 to turn on pack relay RY1 connected to battery pack 20 with the lowest OCV among the plurality of battery packs 20 (S31). When a plurality of battery packs 20 has the lowest OCV, determination unit 313 simultaneously turns on the plurality of pack relays RY1 connected to the plurality of battery packs 20.

While parallel connection control is performed (N in S32), the following processing is performed. Determination unit 313 specifies battery pack 20 with the lowest OCV among battery packs 20 connected to pack relays RY1 in the off state as a connection candidate where pack relay RY1 is to be turned on next (S33).

Based on the SOC of battery pack 20 connected to pack relay RY1 in the on state, calculator 312 refers to SOC-charge upper limit current map 322 to derive the charge upper limit current value of battery pack 20. Calculator 312 applies the OCV, the internal resistance, and the charge upper limit current value of battery pack 20 to the above (Equation 2) to estimate the CCV corresponding to the charge upper limit current value of battery pack 20 (S34). In deriving the SOC, the internal resistance, and the charge upper limit current value of battery pack 20, calculator 312 uses at least the temperature and the SOH of battery pack 20 as parameters.

Calculator 312 estimates a current value flowing through battery pack 20 of the connection candidate (S36) when the CCV of battery pack 20 of the connection candidate is equivalent to (is substantially equal to) the CCV when the connected battery pack 20 is charged at the charge upper limit current value.

The current value flowing from the power source at present is used. The current value actually flowing from the power source is usually lower than the charge upper limit current value, so that the CCV of connected battery pack 20 is lower than the CCV in the case of charge at the charge upper limit current value by voltage corresponding to a current value difference between that from the power source and the discharge upper limit current value. Calculator 312 calculates a difference voltage between the actual CCV of connected battery pack 20 and the CCV of battery pack 20 of the connection candidate (=CCV when connected battery pack 20 is charged at the charge upper limit current value), and estimates the current value flowing through battery pack 20 of the connection candidate based on the difference voltage and internal resistance of battery pack 20 of the connection candidate. This current value is a cross current value flowing from battery pack 20 of the connection candidate to connected battery pack 20.

Calculator 312 estimates the charge upper limit current value of the entire parallel system after battery pack 20 of the connection candidate is connected by subtracting the estimated current value (cross current value) from the charge upper limit current value of the entire parallel system before battery pack 20 of the connection candidate is connected (S37).

Determination unit 313 compares the estimated charge upper limit current value after the connection with a threshold based on the maximum value of the current that can be output from the power source (S38). When the charge upper limit current value after the connection is larger than or equal to the threshold (Y in S38), the determination unit 313 permits the connection of battery pack 20 of the connection candidate (S39), and causes relay drive unit 25 to turn on pack relay RY1 connected to battery pack 20 of the connection candidate. The processing proceeds to step S32. When the charge upper limit current value after the connection is lower than the threshold (N in S38), determination unit 313 does not permit connection of battery pack 20 of the connection candidate (S310). The processing proceeds to step S32.

When pack relay RY1 is turned on in the plurality of battery packs 20, the CCVs corresponding to the charge upper limit current values of the plurality of battery packs 20 are identical to each other. In a state where the CCVs are identical to each other, calculator 312 estimates the CCVs corresponding to the charge upper limit current values of the plurality of battery packs 20 in the on state.

Figure 15:
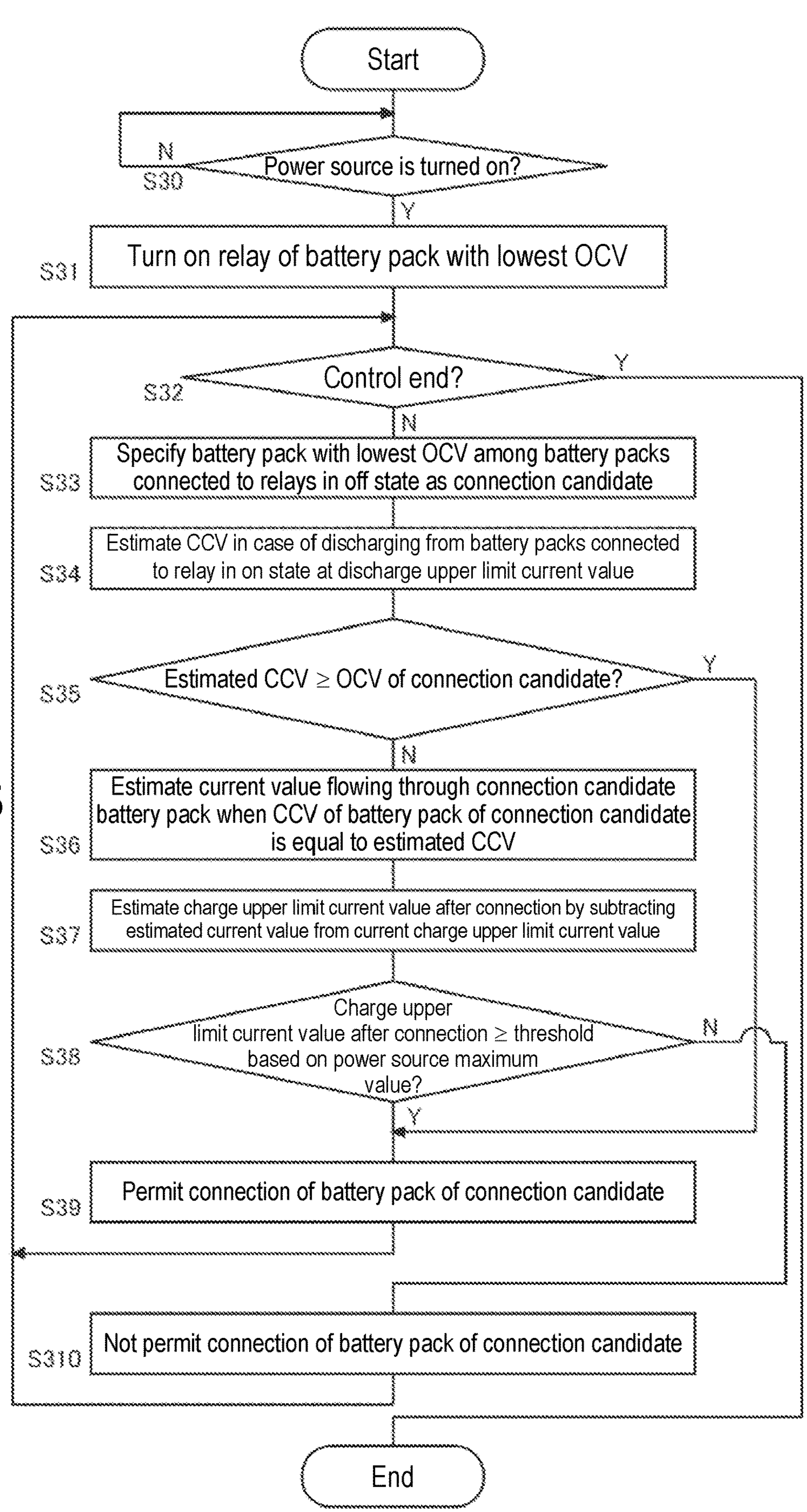
FIG. 15 is a flowchart illustrating processing for determining parallel connection according to an application example of Example 3.

FIG. 15 is a flowchart illustrating processing for determining parallel connection according to an application example of Example 3. The flowchart according to the application example of Example 3 illustrated in FIG. 15 is obtained by adding the processing of step S35 to the flowchart according to a basic example of Example 3 illustrated in FIG. 12.

In step S35, determination unit 313 compares the CCV estimated when connected battery pack 20 is charged at the charge upper limit current value with the OCV of battery pack 20 of the connection candidate (S35). When the estimated CCV is more than or equal to the OCV of battery pack 20 of the connection candidate (Y in S35), determination unit 313 permits the connection of battery pack 20 of the connection candidate (319), and causes relay drive unit 25 to turn on pack relay RY1 connected to battery pack 20 of the connection candidate. The processing proceeds to step S32. When the estimated CCV is higher than the OCV of battery pack 20 of the connection candidate in step S35 (N in S35), the processing proceeds to step S36.

The application example enables calculation processing in steps S36 to S38 to be skipped when the CCV estimated when connected battery pack 20 is charged at the charge upper limit current value is more than or equal to the OCV of battery pack 20 of the connection candidate, and thus enables reducing the amount of calculation.

Next, Example 4 of processing for determining parallel connection during charge will be described. As described above, when the OCVs among the plurality of battery packs 20 connected in parallel are not uniform, a cross current is generated from battery pack 20 with a high OCV to battery pack 20 with a low OCV. Due to the cross current, the OCV of battery pack 20 with a high OCV decreases, and the OCV of battery pack 20 with a low OCV increases. When the voltage does not differ therebetween, the cross current stops. In the state where the cross current stops, the OCVs among the plurality of battery packs 20 connected in parallel are uniform.

Figure 16:
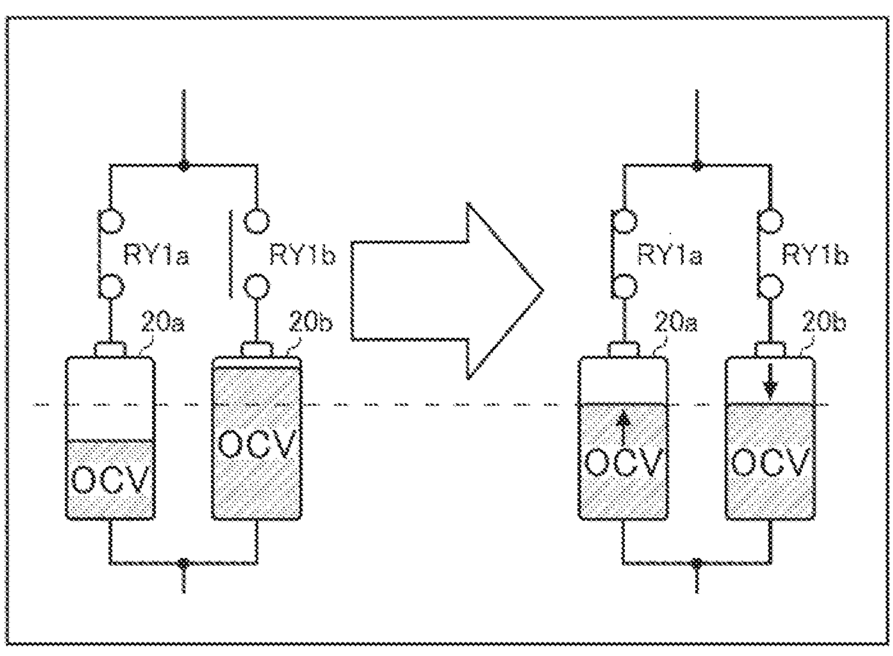
FIG. 16 is a view illustrating a cross current between battery packs and convergence of an open circuit voltage (OCV) during charge.

FIG. 16 is a view illustrating a cross current between battery packs 20 and convergence of an open circuit voltage (OCV) during charge. FIG. 16 illustrates the parallel connection of two battery packs 20 for easy understanding of the description. A state on a left side in FIG. 16 is a state where first pack relay RY1 connected to first battery pack 20*a* is turned on, second pack relay RY1 connected to second battery pack 20*b* is turned off, and the OCV of first battery pack 20*a* is lower than the OCV of second battery pack 20*b*.

A state on a right side in FIG. 16 illustrates a state after turning-on of second pack relay RY1. When first battery pack 20*a* and second battery pack 20*b* are conducted, a current flows from second battery pack 20*b* to first battery pack 20*a*, the OCV of second battery pack 20*b* decreases, and the OCV of first battery pack 20*a* increases. Eventually, when both the OCVs are uniform, the cross current from second battery pack 20*b* to first battery pack 20*a* stops.

The OCV of each of first battery pack 20*a* and second battery pack 20*b* when the cross current stops becomes an average SOC of SOCs of first battery pack 20*a* and second battery pack 20*b* before the cross current is generated under an ideal condition where pack capacities and the like are uniform, and thus the OCV when the cross current stops becomes the OCV corresponding to the average SOC. Even when three or more battery packs 20 having non-uniform OCVs are connected in parallel, the OCVs of three or more battery packs 20 are uniform due to the cross current under the ideal condition. In this case, the OCVs of three or more battery packs 20 after the OCVs are uniform become an average value of the OCVs of three or more battery packs 20 before the generation of the cross current.

In Example 4, calculator 312 estimates the charge upper limit current value of the entire parallel system at the time of convergence of the OCVs after connection of unconnected battery pack 20 to the parallel system. Determination unit 313 permits connection of unconnected battery pack 20 when the estimated charge upper limit current value is larger than or equal to a threshold based on the maximum value of the current that can be output by the power source. Determination unit 313 does not permit connection of unconnected battery pack 20 when the estimated charge upper limit current value is lower than the threshold based on the maximum value of the current that can be output by the power source. Determination unit 313 also permits the connection of unconnected battery pack 20 when the estimated charge upper limit current value is greater than or equal to the charge upper limit current value of the entire parallel system before unconnected battery pack 20 is connected to the parallel system. Determination unit 313 does not permit the connection of unconnected battery pack 20 when the estimated charge upper limit current value is lower than the charge upper limit current value of the entire parallel system before unconnected battery pack 20 is connected to the parallel system.

Figure 17:
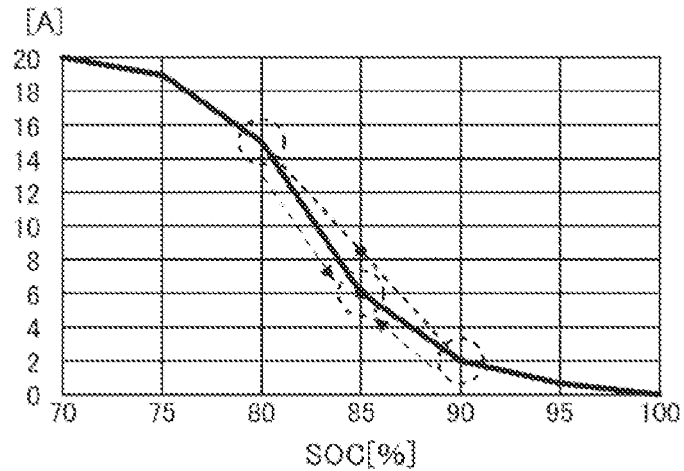
FIG. 17 is a graph illustrating an example of a change in a discharge upper limit power value of an entire parallel system before and after connection of an unconnected battery pack during charge.

FIG. 17 is a graph illustrating an example of a change in a charge upper limit current value of an entire parallel system before and after connection of unconnected battery pack 20 during charge. For example, a state where first battery pack 20*a* is connected to the power source and second battery pack 20*b* is not connected to the power source as in the state on the left side in FIG. 16 will be considered. Hereinafter, a battery pack using the same type of cells will be described on the premise that conditions regarding pack capacity, SOH, and temperature are the same. First battery pack 20*a* has a SOC of 80%, and second battery pack 20*b* has a SOC of 90%. Referring to the SOC-charge upper limit current characteristics illustrated in FIG. 17, the charge upper limit current value is 15 A when the SOC is 80%. Similarly, the charge upper limit current value of the entire parallel system to which only first battery pack 20*a* is connected is 15 A.

Next, a state after connection of second battery pack 20*b* to the parallel system as in the state on the right side in FIG. 16 will be considered. When second battery pack 20*b* is connected to the parallel system, a cross current is generated from second battery pack 20*b* to first battery pack 20*a*. Due to the cross current, the SOC of second battery pack 20*b* decreases, and the SOC of first battery pack 20*a* increases. When both the SOCs reach 85%, the cross current stops. Referring to the SOC-charge upper limit current characteristics illustrated in FIG. 17, the charge upper limit current value is 6 A when the SOC is 85%. Thus, the charge upper limit current value of the entire parallel system in a state where first battery pack 20*a* and second battery pack 20*b* are connected is 12 A (=6 A×2).

In this example, when second battery pack 20*b* is connected, the charge upper limit current value of the entire parallel system decreases from 15 A to 12 A. As illustrated in FIG. 16, when a discharge upper limit current value in a state where the SOCs are uniform (SOC=85%) is present below an imaginary line obtained by connecting the charge upper limit current value (15 A) of first battery pack 20*a* and the charge upper limit current value (2 A) of second battery pack 20*b* before connection of second battery pack 20*b*, the charge upper limit current value of the entire parallel system is lower than a current value obtained by simply averaging the charge upper limit current value (15 A) of first battery pack 20*a* and the charge upper limit current value (2 A) of second battery pack 20*b* before the connection. Thus, when the charge upper limit current value of the entire parallel system after the second battery pack 20*b* is connected is estimated without referring to the SOC-charge upper limit current characteristics, a state may occur in which the charge upper limit current value is excessively estimated and an actual charge upper limit current value becomes lower than a charge current value from charger 2.

Figure 18:
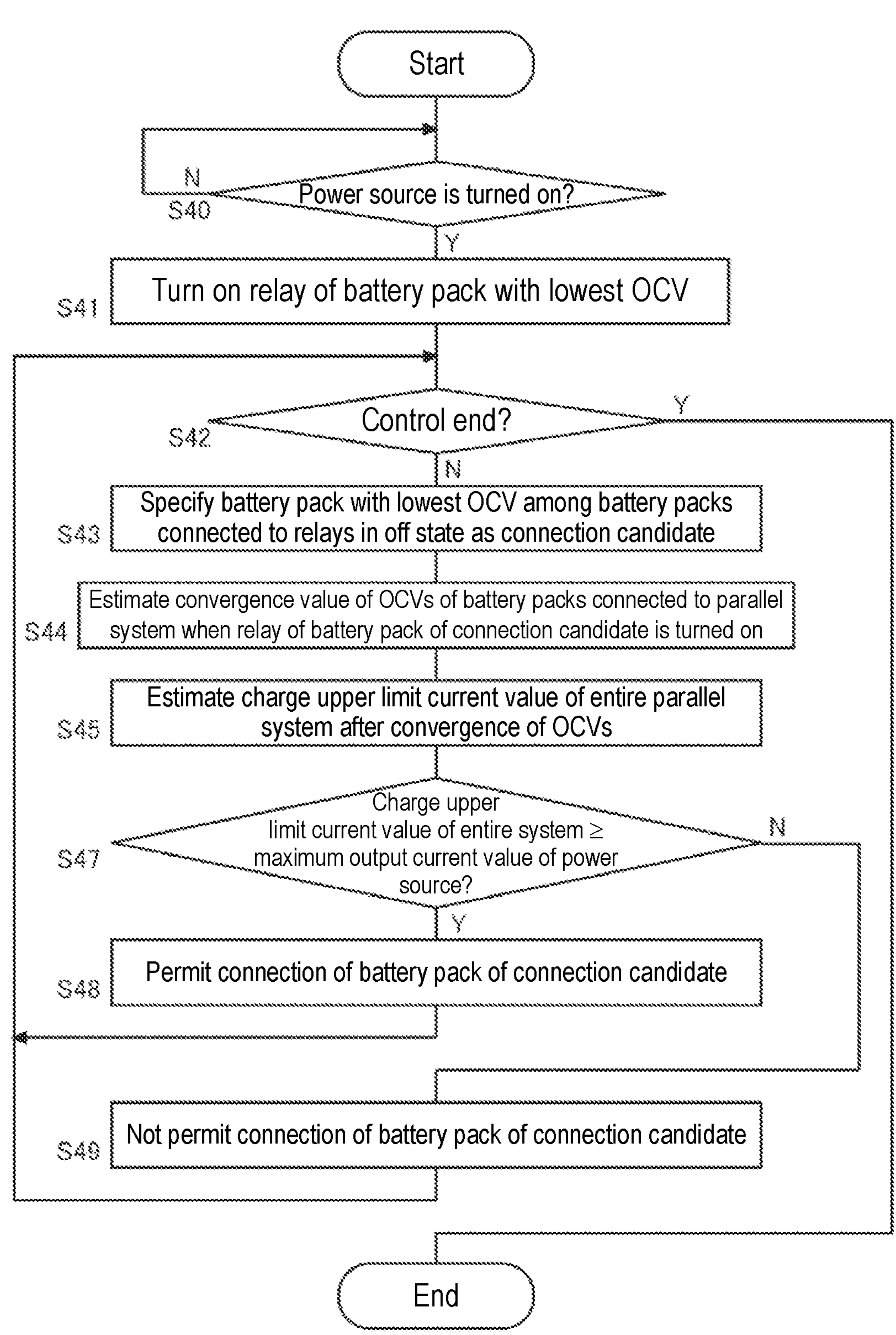
FIG. 18 is a flowchart illustrating processing for determining parallel connection according to Example 4.

FIG. 18 is a flowchart for describing the processing for determining parallel connection according to Example 4. When the power source of electric vehicle 1 is turned on (Y in S40), determination unit 313 causes relay drive unit 25 to turn on pack relay RY1 connected to battery pack 20 with the lowest OCV among the plurality of battery packs 20 (S41). When a plurality of battery packs 20 has the lowest OCV, determination unit 313 simultaneously turns on the plurality of pack relays RY1 connected to the plurality of battery packs 20.

When battery pack 20 where pack relay RY1 is in the off state is present while the parallel connection control is being executed (N in S42), the following processing is performed. Determination unit 313 specifies battery pack 20 with the lowest OCV among battery packs 20 connected to pack relays RY1 in the off state as a connection candidate where pack relay RY1 is to be turned on next (S43).

Calculator 312 estimates a convergence value of the OCVs of the plurality of battery packs 20 connected to the parallel system when battery pack 20 as the connection candidate is turned on (S44). Calculator 312 refers to SOC-charge upper limit current map 322 to derive the charge upper limit current value of one battery pack 20 based on an SOC corresponding to the converged OCV. Calculator 312 multiplies the charge upper limit current value of one battery pack 20 by the parallel number to estimate the charge upper limit current value of the entire parallel system (S45). In deriving the SOC and the charge upper limit current value of battery pack 20, calculator 312 uses at least the temperature and the SOH of battery pack 20 as parameters.

Determination unit 313 compares the estimated charge upper limit current value of the entire parallel system with a threshold based on the maximum value of the current that can be output from the power source (S47). When the estimated charge upper limit current value is larger than or equal to the threshold (Y in S47), the determination unit 313 permits the connection of battery pack 20 of the connection candidate (S48), and causes relay drive unit 25 to turn on pack relay RY1 connected to battery pack 20 of the connection candidate. When the estimated charge upper limit current value is lower than the threshold (N in S47), determination unit 313 does not permit connection of battery pack 20 of the connection candidate (S49). The processing proceeds to step S42.

Figure 19:
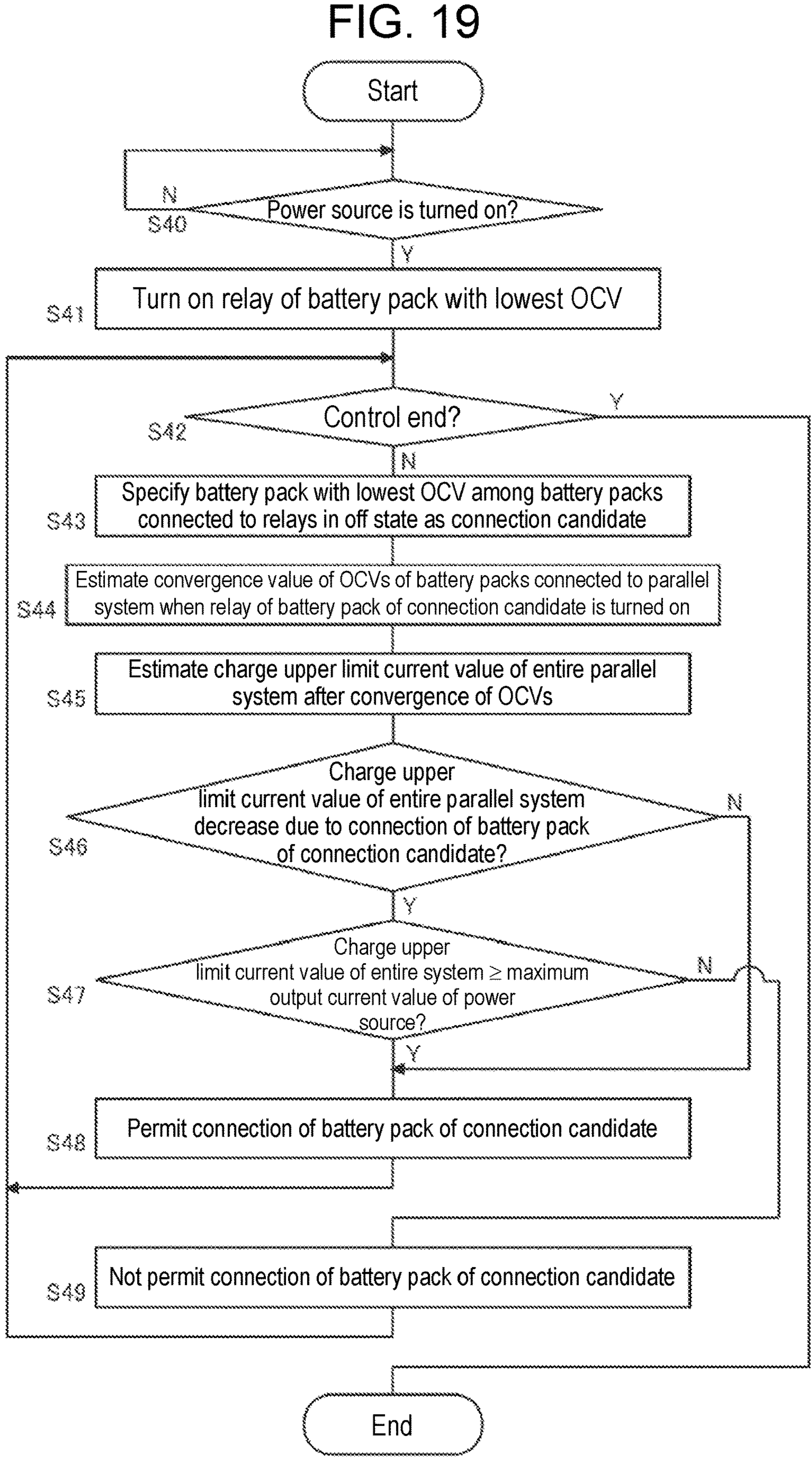
FIG. 19 is a flowchart illustrating processing for determining parallel connection according to a modified example of Example 4.

FIG. 19 is a flowchart illustrating processing for determining parallel connection according to a modified example of Example 4. The flowchart according to a modified example of Example 4 illustrated in FIG. 19 is obtained by adding the processing of step S46 to the flowchart according to a basic example of Example 4 illustrated in FIG. 18.

In step S46, determination unit 313 determines whether the estimated charge upper limit current value of the entire parallel system decreases due to the connection of battery pack 20 of the connection candidate (S46). When the charge upper limit current value of the entire parallel system does not decrease (N in S46), determination unit 313 permits the connection of battery pack 20 as the connection candidate (S48), and causes relay drive unit 25 to turn on pack relay RY1 connected to battery pack 20 as the connection candidate. When the charge upper limit current value of the entire parallel system decreases (Y in S46), the processing proceeds to step S47.

The modified example enables standby time of battery pack 20 to be reduced by permitting the connection of the unconnected battery pack 20 having no problem in practical use even when the charge upper limit power value decreases under a basic criterion for determining whether the charge upper limit power value of the entire parallel system decreases after the connection of the unconnected battery pack 20.

Examples 3, 4 each described above prohibits connection of unconnected battery pack 20 when the charge upper limit current value or the charge upper limit power value of the entire parallel system due to the connection of unconnected battery pack 20 is lower than the threshold based on the maximum value of the current or power allowed to be output by the power source. This enables preventing an increase in charging time and waste of regenerative energy, so that battery pack 20 can be prevented from decreasing in charging efficiency.

The present disclosure has been described above based on the exemplary embodiment. It is to be understood by the person of ordinary skill in the art that the exemplary embodiment is an example, that combinations of its configuration elements and processing processes can have various modified examples, and that such modified examples are also within the scope of the present disclosure.

The processing for determining parallel connection of Example 1 and the processing for determining parallel connection of Example 2 may be used in combination. This case allows battery pack 20 of the connection candidate to be connected when the connection is permitted in each determination processing, and does not allow battery pack 20 of the connection candidate to be connected when the connection is not permitted in at least one determination processing. For example, even when the connection of battery pack 20 of the connection candidate is permitted in the determination processing of Example 2, the connection may not be permitted in the determination processing of Example 1.

The determination processing of Example 2 is performed to determine whether battery pack 20 of the connection candidate can be connected, based on the discharge upper limit value of the entire parallel system at a certain time in the future. The discharge upper limit value in the process until reaching that time is not considered. In contrast, the determination processing of Example 1 is performed to determine whether battery pack 20 of the connection candidate can be connected, based on the discharge upper limit value that is at a current time and that momentarily changes. Thus, determination results of Examples 1 and 2 do not coincide in some cases. When the parallel connection determination processing of Example 1 and the parallel connection determination processing of Example 2 are used in combination, the current to be supplied from the parallel system to the load can be further improved in stability.

The processing for determining parallel connection of Example 3 and the processing for determining parallel connection of Example 4 may be used in combination. This case allows battery pack 20 of the connection candidate to be connected when the connection is permitted in each determination processing, and does not allow battery pack 20 of the connection candidate to be connected when the connection is not permitted in at least one determination processing. For example, even when the connection of battery pack 20 of the connection candidate is permitted in the determination processing of Example 4, the connection may not be permitted in the determination processing of Example 3.

The determination processing of Example 4 is performed to determine whether battery pack 20 of the connection candidate can be connected, based on the charge upper limit value of the entire parallel system at a certain time in the future. The charge upper limit value in the process until reaching that time is not considered. In contrast, the determination processing of Example 3 is performed to determine whether battery pack 20 of the connection candidate can be connected, based on the charge upper limit current value that is at a current time and that momentarily changes. Thus, determination results of Examples 3 and 4 do not coincide in some cases. When the processing for determining parallel connection of Example 3 and the processing for determining parallel connection of Example 4 are used in combination, a decrease in charging efficiency can be further prevented from occurring.

The above-described exemplary embodiment has described an example in which management unit 30 is provided outside the plurality of battery packs 20. In this regard, management unit 30 may be provided inside any one of the plurality of battery packs 20. In this case, battery pack 20 that implements the function of management unit 30 serves as a master device, and remaining battery packs 20 serve as slave devices.

The above-described exemplary embodiment has described the example in which detachable and replaceable battery packs 20 are connected in parallel. In this regard, fixed battery packs 20 may be connected in parallel. When fixed battery packs 20 are used, functions of controllers 24 provided in respective battery packs 20 and management unit 30 can be integrated. For example, controllers 24 and management unit 30 may be implemented by one microcomputer.

The above-described exemplary embodiment has described an example of using battery pack 20 incorporating battery module M1 including the lithium ion battery cell, the nickel metal hydride battery cell, the lead battery cell, or the like. In this regard, a capacitor pack incorporating a capacitor module including an electric double layer capacitor cell and a lithium ion capacitor cell may be used. The present description is described in which the battery module and the capacitor module are collectively referred to as a power storage module, and the battery pack and the capacitor pack are collectively referred to as a power storage pack.

The above-described exemplary embodiment has described an example in which detachable and replaceable power storage packs are connected in parallel. In this regard, the present disclosure is also applicable to processing for determining parallel connection of a plurality of power storage modules in one power storage pack. The above-described exemplary embodiment shows an assumed example where one power storage module is provided in one power storage pack, so that the processing for determining the parallel connection of the plurality of power storage packs is synonymous with the processing for determining the parallel connection of the plurality of power storage modules.

A moving body using replaceable battery pack 20 as a power source is not limited to electric vehicle 1. For example, the moving body also includes an electric ship. For example, replaceable battery pack 20 may be used as a power source of a water bus or a water taxi. Battery pack 20 may supply power to an outboard motor. The moving body also include a train. For example, a train equipped with replaceable battery pack 20 can be used instead of a diesel train used in a non-electrified railway line. The moving body also includes an electric flying object. The electric flight object includes a multicopter (drone). The multicopter includes a so-called flying car.

The exemplary embodiment may be specified by the following items.

[Item 1] Management device (30) manages a plurality of power storage modules (M1) connected in parallel to load (60) with switches (RY1) and has a first state where some of switches (RY1) connected to some of the plurality of power storage modules (M1) are turned on and other of switches (RY1) connected to remaining power storage modules (M1) are turned off, the management device (30) including determination unit (313) that does not permit turning on at least one of the other of switches (RY1) connected to remaining power storage modules (M1) and turned off in the first state when an upper limit value of current or power that is allowed to be discharged to load (60) from the entire plurality of power storage modules (M1) is lower than a first threshold based on a maximum value of current or power required by load (60) in a state where the at least one of the other of switches (RY1) is turned on.

This configuration enables preventing a shortage of a current to be supplied to load (60) from the entire plurality of power storage modules (M1) connected in parallel due to new connection of unconnected power storage module (M1).

[Item 2] Management device (30) according to Item 1 further includes acquisition unit (311) that acquires at least a state of charge (SOC) for each of the plurality of power storage modules (M1), and calculator (312) that estimates an upper limit value of current or power allowed to be supplied from the entire plurality of power storage modules (M1), based on SOC-discharge upper limit characteristics that define a relationship between the SOC of each of the plurality of power storage modules (M1) and the upper limit value of current or power allowed to be discharged from corresponding one of the plurality of power storage modules (M1), wherein the SOC-discharge upper limit characteristics show that the upper limit value of current or power allowed to be discharged from each of the plurality of power storage modules (M1) decreases as the SOC of corresponding one of the plurality of power storage modules (M1) decreases. This configuration enables accurate specifying of the upper limit value of current or power allowed to be supplied to load (60) from the entire plurality of power storage modules (M1).

[Item 3] Management device (30) according to Item 2, wherein acquisition unit (311) acquires open circuit voltage (OCV) of power storage module (M1) of the connection candidate among remaining power storage modules (M1), calculator (312) derives a first upper limit value of current or power allowed to be discharged from each of power storage modules (M1) based on the SOC-discharge upper limit characteristics and a state of charge (SOC) of corresponding one of power storage modules (M1) connected to load (60), and estimates closed circuit voltage (CCV) of each of power storage modules (M1) when discharging is performed from corresponding one of power storage modules (M1) at the first upper limit value, determination unit (313) permits turning on the switch connected to the power storage module of the connection candidate when the OCV of power storage module (M1) of the connection candidate is larger than or equal to the estimated CCV of power storage module (M1), calculator (312) estimates a current value flowing through power storage module (M1) of the connection candidate when the CCV of power storage module (M1) of the connection candidate corresponds to the CCV of each of power storage modules (M1) connected to load (60) when discharging is performed at the first upper limit value, when the OCV of power storage module (M1) of the connection candidate is lower than or equal to the estimated CCV of power storage module (M1), and determination unit (313) permits turning on the switch when a second upper limit value of current or power allowed to be discharged from the entire plurality of power storage modules (M1) is larger than or equal to the first threshold, the second upper limit value being acquired by subtracting the estimated current value from the first upper limit value.

This configuration enables dynamic determination whether the current to be supplied from the entire plurality of power storage modules (M1) to load (60) becomes insufficient.

[Item 4] Management device (30) according to Item 2 or 3, wherein calculator (312) estimates a third upper limit value of current or power allowed to be supplied to load (60) from the entire plurality of power storage modules (M1) when the OCV of each of the plurality of power storage modules (M1) connected to load (60) corresponds to the OCV of power storage module (M1) of the connection candidate after switch (RY1) connected to power storage module (M1) of the connection candidate is turned on, the third upper limit value being estimated based on the SOC-discharge upper limit characteristics, the SOC corresponding to OCV of each of the plurality of power storage modules (M1) connected to load (60), and the SOC corresponding to OCV of power storage module (M1) of the connection candidate, and determination unit (313) does not permit turning on switch (RY1) connected to power storage module (M1) of the connection candidate when the estimated third upper limit value is less than the first threshold or a second threshold based on an upper limit value before switch (RY1) is turned on.

This configuration enables static prediction whether the current to be supplied from the entire plurality of power storage modules (M1) to load (60) becomes insufficient.

[Item 5] Management device (30) according to any one of Items 1 to 4, wherein when power supply from the plurality of power storage modules (M1) to load (60) is started, switch (RY1) is turned on, switch (RY1) being connected to power storage module (M1) with a highest OCV among the plurality of power storage modules (M1), and power storage module (M1) with a highest OCV among power storage modules (M1) connected to respective switches (RY1) turned off is a connection candidate connected to switch (RY1) to be turned on next. This configuration enables connecting the plurality of power storage modules (M1) in parallel while preventing shortage of current to be supplied to load (60).

[Item 6] Power supply system (10) includes a plurality of power storage modules (M1) connected in parallel to load (60) with respective switches (RY1), and management device (30) according to any one of Items 1 to 5.

This configuration enables fabricating power supply system (10) that can prevent shortage of current to be supplied to load (60) from the entire plurality of power storage modules (M1) connected in parallel, the shortage being caused by connecting unconnected power storage module (M1).

[Item 7] Power supply system (10) according to Item 6, wherein load (60) is motor (60) of moving body (1), and management device (30) notifies controller (40) in moving body (1) of an upper limit value of current or power allowed to be supplied from the entire plurality of power storage modules (M1) to motor (60).

This configuration enables preventing occurrence of adverse effects such as degradation in acceleration performance of moving body (1).

[Item 8] Management device (30) manages a plurality of power storage modules (M1) connected in parallel to power source (60, 2) with switches (RY1) and has a first state where some of switches (RY1) connected to some of the plurality of power storage modules (M1) are turned on and other of switches (RY1) connected to remaining power storage modules (M1) are turned off, the management device (30) including determination unit (313) that does not permit turning on at least one of the other of switches (RY1) connected to remaining power storage modules (M1) and turned off in the first state when an upper limit value of current or power that is allowed to charge the entire plurality of power storage modules (M1) is lower than a third threshold based on a maximum value of current or power allowed to be output by power source (60, 2) in a state where the at least one of the other of switches (RY1) is turned on.

This configuration enables preventing decrease in efficiency of charging from the power source (60, 2) to the entire plurality of power storage modules (M1), the decrease being caused by connecting unconnected power storage module (M1).

[Item 9] Management device (30) according to Item 8 further includes acquisition unit (311) that acquires at least a state of charge (SOC) for each of the plurality of power storage modules (M1), and calculator (312) that estimates an upper limit value of current or power allowed to charge the entire plurality of power storage modules (M1), based on SOC-charge upper limit characteristics that define a relationship between the SOC of each of the plurality of power storage modules (M1) and the upper limit value of current or power allowed to charge corresponding one of the plurality of power storage modules (M1), wherein the SOC-charge upper limit characteristics show that the upper limit value of current or power allowed to charge each of the plurality of power storage modules (M1) decreases as the SOC of corresponding one of the plurality of power storage modules (M1) increases.

This configuration enables accurate specifying of the upper limit value of current or power allowed to charge the plurality of power storage modules (M1).

[Item 10] Management device (30) according to item 9, wherein acquisition unit (311) acquires open circuit voltage (OCV) of power storage module (M1) of a connection candidate among remaining power storage modules (M1), calculator (312) derives a first upper limit value of current or power allowed to charge each of power storage modules (M1) based on the SOC-discharge upper limit characteristics and a state of charge (SOC) of corresponding one of power storage modules (M1) connected to power source (60, 2), and estimates closed circuit voltage (CCV) of each of power storage modules (M1) when corresponding one of power storage modules (M1) is charged at the first upper limit value, determination unit (313) permits turning on switch (RY1) connected to the power storage module (M1) of the connection candidate when the OCV of power storage module (M1) of the connection candidate is smaller than or equal to the estimated CCV of power storage module (M1), calculator (312) estimates a current value flowing through power storage module (M1) of the connection candidate when the CCV of power storage module (M1) of the connection candidate corresponds to the CCV of each of power storage modules (M1) connected to power source (60, 2) charged at the first upper limit value, when the OCV of power storage module (M1) of the connection candidate is larger than or equal to the estimated CCV of power storage module (M1), and determination unit (313) permits turning on the switch when a second upper limit value of current or power allowed to charge the entire plurality of power storage modules (M1) is larger than or equal to the third threshold, the second upper limit value being acquired by subtracting the estimated current value from the first upper limit value.

This configuration enables dynamic determination whether efficiency of charging the entire plurality of power storage modules (M1) from power source (60, 2) decreases.

[Item 11] Management device (30) according to Item 9 or 10, wherein calculator (312) estimates a third upper limit value of current or power allowed to charge the entire plurality of power storage modules (M1) when the OCV of each of the plurality of power storage modules (M1) connected to power source (60, 2) corresponds to the OCV of power storage module (M1) of the connection candidate after switch (RY1) connected to power storage module (M1) of the connection candidate is turned on, the third upper limit value being estimated based on the SOC-charge upper limit characteristics, the SOC corresponding to OCV of each of the plurality of power storage modules (M1) connected to power source (60, 2), and the SOC corresponding to OCV of power storage module (M1) of the connection candidate, and determination unit (313) does not permit turning on switch (RY1) connected to power storage module (M1) of the connection candidate when the estimated third upper limit value is less than the third threshold or a fourth threshold based on an upper limit value before switch (RY1) is turned on. This configuration enables static prediction whether efficiency of charging the entire plurality of power storage modules (M1) from power source (60, 2) decreases.

[Item 12] Management device (30) according to any one of Items 8 to 11, wherein when power supply from power source (60, 2) to the plurality of power storage modules (M1) is started, switch (RY1) is turned on, switch (RY1) being connected to power storage module (M1) with a lowest OCV among the plurality of power storage modules (M1), and power storage module (M1) with a lowest OCV among some of power storage modules (M1), the some being connected to respective switches (RY1) turned off, is a connection candidate connected to switch (RY1) to be turned on next.

This configuration enables connecting the plurality of power storage modules (M1) in parallel while preventing decrease in efficiency of charging the entire plurality of power storage modules (M1) from power source (60, 2).

[Item 13] Power supply system (10) includes a plurality of power storage modules (M1) connected in parallel to power source (60, 2) with respective switches (RY1), and management device (30) according to any one of Items 8 to 12. This configuration enables fabricating power supply system (10) capable of preventing decrease in efficiency of charging from the power source (60, 2) to the entire plurality of power storage modules (M1), the decrease being caused by connecting unconnected power storage module (M1).

[Item 14] Power supply system (10) according to item 13, wherein power source (60, 2) is motor (60) of moving body (1) or external charger (2), and management device (30) notifies controller (40) in moving body (1) of an upper limit value of current or power allowed to be regenerated from motor (60) to the entire plurality of power storage modules (M1). This configuration enables preventing the regenerative energy generated by motor (60) from being wasted.

REFERENCE MARKS IN THE DRAWINGS

1: electric vehicle
2: charger
3: system
5: charging cable
10: power supply system
20: battery pack
30: management unit
M1: battery module
E1-En: cell
21: voltage measurement unit
22: temperature measurement unit
23: current measurement unit
24: controller
241: SOC-OCV map
25: relay drive unit
31: processor
311: acquisition unit
312: calculator
313: determination unit
314: notification unit
32: storage unit
321: SOC-discharge upper limit current map
322: SOC-charge upper limit current map
40: vehicle ECU
50: inverter
60: motor
70: AC/DC converter
RYc: main relay
RY1: pack relay
Rs: shunt resistor
T1, T2: temperature sensor

The invention claimed is:

1. A management device that manages a plurality of power storage modules each connected in parallel to a load via a corresponding switch and includes a first state in which a switch corresponding to each of one or more power storage modules of the plurality of power storage modules is turned on and a switch corresponding to each of one or more remaining power storage modules of the plurality of power storage modules is turned off, the management device comprising:

an acquisition unit configured to acquire at least a state of charge for each of the plurality of power storage modules;

a calculator configured to estimate an upper limit value of current or power allowed to be discharged from all of the plurality of power storage modules, based on SOC-discharge upper limit characteristics that define a relationship between the state of charge of each of the plurality of power storage modules and an upper limit value of current or power allowed to be discharged from a corresponding one of the plurality of power storage modules, wherein the SOC-discharge upper limit characteristics show that the upper limit value of current or power allowed to be discharged from each of the plurality of power storage modules decreases as the state of charge of the corresponding one of the plurality of power storage modules decreases; and a determination unit configured to not permit turning on the switch corresponding to at least one of the one or more remaining power storage modules and turned off in the first state when;

the switch corresponding to each of the one or more power storage modules of the plurality of power storage modules is turned on, and the upper limit value of current or power that is allowed to be discharged to the load from all of the plurality of power storage modules in a state where the switch corresponding to the at least one of the one or more remaining power storage module is turned on is lower than a first threshold based on a maximum value of current or power required by the load, wherein the acquisition unit acquires an open circuit voltage of a power storage module of a connection candidate among the one or more remaining power storage modules, the calculator derives a first upper limit value of current or power allowed to be discharged from each of the plurality of power storage modules connected to the load based on the SOC-discharge upper limit characteristics and the state of charge of each of the plurality of power storage modules connected to the load, and estimates a closed circuit voltage of each of the plurality of power storage modules connected to the load when discharging is performed from the plurality of power storage modules connected to the load at the first upper limit value, the determination unit permits turning on the switch connected to the power storage module of the connection candidate among the one or more remaining power storage modules, when the open circuit voltage of the power storage module of the connection candidate among the one or more remaining power storage modules is larger than or equal to the closed circuit voltage of each of the plurality of power storage modules connected to the load, the calculator estimates, when the open circuit voltage of the power storage module of the connection candidate among the one or more remaining power storage modules is lower than or equal to the closed circuit voltage of each of the plurality of power storage modules connected to the load, a current value flowing through the power storage module of the connection candidate among the one or more remaining power storage modules when the closed circuit voltage of the power storage module of the connection candidate corresponds to the closed circuit voltage of each of the plurality of power storage modules connected to the load when discharging is performed at the first upper limit value, and the determination unit permits turning on the switch connected to the power storage module of the connection candidate among the one or more remaining power storage modules when a second upper limit value of current or power allowed to be discharged from all of the plurality of power storage modules is larger than or equal to the first threshold, the second upper limit value being acquired by subtracting the current value from the first upper limit value.

2. The management device according to claim 1, wherein the calculator estimates a third upper limit value of current or power allowed to be discharged from all of the plurality of power storage modules when the open circuit voltage of each of the plurality of power storage modules connected to the load corresponds to the open circuit voltage of the power storage module of the connection candidate after the switch connected to the power storage module of the connection candidate among the one or more remaining power storage modules is turned on, the third upper limit value being estimated based on:

the SOC-discharge upper limit characteristics, the state of charge corresponding to the open circuit voltage of each of the plurality of power storage modules connected to the load, and the state of charge corresponding to the open circuit voltage of the power storage module of the connection candidate, and the determination unit does not permit turning on the switch connected to the power storage module of the connection candidate among the one or more remaining power storage modules when the third upper limit value is less than the first threshold or a second threshold based on the third upper limit value before the switch connected to the power storage module of the connection candidate is turned on.

3. The management device according to claim 1, wherein when power supply from the plurality of power storage modules to the load is started, a switch connected to a power storage module with a highest open circuit voltage among the plurality of power storage modules is turned on, and a power storage module with the highest open circuit voltage among the one or more remaining power storage modules whose switches are in an off state, is a connection candidate connected to a switch to be turned on next.

4. A power supply system comprising:

the management device according to claim 1, and the plurality of power storage modules each connected in parallel to the load via the corresponding switch.

5. The power supply system according to claim 4, wherein the load is a motor of a moving body, and the management device notifies a controller in the moving body of the upper limit value of current or power allowed to be supplied from all of the plurality of power storage modules to the motor.

* * * * *